(12) United States Patent
Gupta et al.

(10) Patent No.: US 9,973,294 B2
(45) Date of Patent: May 15, 2018

(54) PASSBAND ABSTRACTION LAYER

(71) Applicant: Infinera Corporation, Annapolis Junction, MD (US)

(72) Inventors: Parveen Kumar Gupta, Bangalore (IN); Nikhil Kumar Satyarthi, Bangalore (IN); Omer Faruk Yilmaz, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days. days.

(21) Appl. No.: 15/235,857

(22) Filed: Aug. 12, 2016

(65) Prior Publication Data
US 2018/0048415 A1    Feb. 15, 2018

(51) Int. Cl.
*H04B 10/00* (2013.01)
*H04J 14/02* (2006.01)
*H04Q 11/00* (2006.01)
*H04J 14/00* (2006.01)

(52) U.S. Cl.
CPC ...... *H04J 14/0212* (2013.01); *H04Q 11/0005* (2013.01); *H04Q 11/0062* (2013.01); *H04Q 2011/0016* (2013.01); *H04Q 2011/0041* (2013.01); *H04Q 2011/0079* (2013.01); *H04Q 2011/0086* (2013.01)

(58) Field of Classification Search
CPC .............. H04B 10/2939; H04B 10/294; H04B 10/296; H04Q 2011/0037; H04Q 2011/0041; H04Q 2011/0075; H04Q 2011/0077; H04Q 2011/0079; H04Q 2011/0088
See application file for complete search history.

(56) References Cited

U.S. PATENT DOCUMENTS

| 2015/0131989 A1* | 5/2015 | Syed | .................... H04L 41/0803 398/45 |
| 2016/0204875 A1* | 7/2016 | Araki | .................... H04B 10/572 398/34 |

* cited by examiner

*Primary Examiner* — Daniel Dobson
(74) *Attorney, Agent, or Firm* — David L. Soltz

(57) ABSTRACT

A node in an optical network may include a wavelength selective switch (WSS) and a processor. The wavelength selective switch may have a plurality of input ports and a plurality of output ports for routing and/or power-controlling of optical slices. The wavelength selective switch may have a plurality of control passbands, each control passband including a one or more optical slices. The processor may determine a passband group (PBG) having a plurality of PBG passbands, each of the plurality of PBG passbands corresponding to a particular control passband. The PBG may be used to translate control information, notifications, and/or instructions.

14 Claims, 10 Drawing Sheets

PASSBAND ABSTRACTION LAYER

BACKGROUND

Aspects of this disclosure relate generally to communication systems, and more particularly to a node in an optical network.

Optical signals are increasingly used to communicate data in telecommunication systems. Optical communication systems are capable of high-speed data transfer. Moreover, optical signals are generally of high quality because, for example, they are not distorted by electromagnetic fields.

An optical link may carry optical signals from one part of an optical network to another. The optical link may include optical fibers that carry the optical signals over long distances without compromising the quality of the optical signal. In order to increase the efficiency of the networks and utilize the fiber capacity, various wavelengths are multiplexed and carried on a single optical fiber. The wavelengths may be sufficiently spaced in the optical spectrum so as not to interference with one another.

The optical fibers may be linked to one another with nodes. The nodes may receive an optical signal on one optical fiber and/or launch an optical signal on another optical fiber. The node may also amplify, reroute, add, and/or drop one or more optical signals.

SUMMARY

The following summary is an overview provided solely to aid in the description of various aspects of the disclosure and is provided solely for illustration of the aspects and not limitation thereof.

In one example, a node in an optical network is disclosed. The node may include, for example, a wavelength selective switch having a plurality of input ports and a plurality of output ports, one or more of the plurality of input ports receiving first and second superchannels, the first superchannel having a first plurality of optical carriers, each of the first plurality of optical carriers having a corresponding one of a first plurality of wavelengths and the second superchannel having a second plurality of optical carriers, each of the second plurality of optical carriers having a corresponding one of a second plurality of wavelengths, the wavelength selective switch having a plurality of control passbands, each of the first plurality of wavelengths and each of the second plurality of wavelengths being within at least one of the plurality of control passbands, collectively, the first and second pluralities of optical carriers constituting a group of optical carriers, and, collectively, the first and second pluralities of wavelengths constituting a group of wavelengths; and a processor that determines a passband group (PBG), which is associated with a plurality of PBG passbands, each of the plurality of PBG passbands corresponding to a plurality of sets of optical slices, a wavelength of the group of wavelengths being within an optical slice of one of the plurality of sets of optical slices, a characteristic of an optical carrier within the group of optical carriers and having the wavelength being controlled and monitored based, at least in part, on the optical slice.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
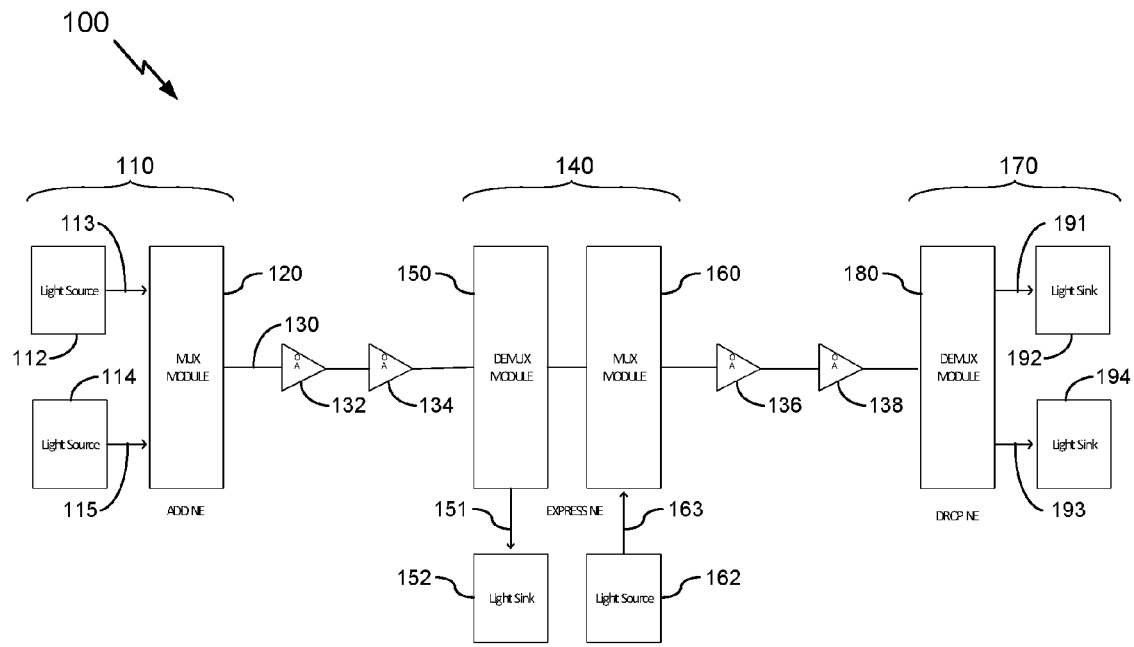
FIG. 1 generally illustrates an optical link.

The present disclosure relates generally to communication systems, and more particularly to serialized optical power control system in an optical communications network.

An optical spectrum may be divided into a plurality of optical slices. For some purposes, an optical slice may be the fundamental component—i.e., the smallest recognized unit—of the optical spectrum. For example, all other constituents of the optical spectrum may include one or more optical slices. Each optical slice may be defined, for example, in terms of a center frequency and a bandwidth. Two optical slices may be contiguous, meaning that there are no frequencies between the two optical slices.

In optical systems, data may be transmitted on superchannels. Each superchannel may include one or more optical carriers, and each optical carrier may include one or more contiguous optical slices. Superchannels may be transmitted across an optical link including one or more nodes. The optical link may further transmit control information that is associated with a particular superchannel. The control information may include, for example, optical parameters such as a measured power level, an active number of wavelengths, a noise level, and/or a superchannel passband count. The control information may be associated with a particular superchannel. For example, first control information may be associated with a first superchannel and second control information may be associated with a second superchannel. The control information may be transmitted in an "upstream" direction (in a direction from which the associated superchannel is received) and/or in a "downstream" direction (in a direction in which the associated superchannel is transmitted).

Each node may include a user interface. The user interface may be configured to exchange control information in "northbound" and "southbound" directions, respectively. The control information may include notifications that are provided to, for example, a technician who is servicing and/or maintaining the node. The control information may further include instructions that are received from the technician. The notifications and/or instructions may be associated with a particular superchannel. The notifications may include, for example, fault monitoring notifications, alarm monitoring notifications, performance monitoring notifications, and/or status reporting notifications. The instructions may include, for example, service provisioning instructions and configuration change instructions.

Some nodes, such as multiplexers and demultiplexers, include a wavelength selective switch (WSS). A WSS may have at least two functions: (1) routing of optical signals and (2) power-control of optical signals. Some WSSs may be able to route and/or power-control individual optical slices of the optical spectrum. However, due to hardware constraints, many WSSs typically exert joint control over a plurality of contiguous optical slices. The plurality of contiguous optical slices controlled by the WSS may be referred to as a "control passband". Due to the hardware constraints, a particular control passband may or may not correspond to a particular superchannel. For example, the minimum number of optical slices associated with a particular control passband may be three, and a particular superchannel may include fewer than three optical slices. As a result, any control information, notification, or instruction that is associated with a particular superchannel may also be relevant to other dependent superchannels since both are jointly controlled due to the shared control passbands in the WSS. Moreover, any control information, notification, or instruction that is associated with a particular control passband may be relevant to any number of superchannels.

As a solution consistent with the present disclosure, a passband group (PBG) is provided that may be used for (1) mapping of superchannels to control passbands and (2) translation of control information, notifications, or instructions. The PBG may have a plurality of PBG passbands, each of which corresponds to a particular control passband. The optical slices associated with each particular superchannel may then be mapped to corresponding PBG passbands. Conceptually, the PBG may exist in a passband abstraction layer (PAL) implemented within the node. The translation may occur as control information passes through the PAL. As will be discussed in greater detail below, the translation may sometimes necessitate the combining of control information associated with different superchannels into combined control information and/or the separating of control information associated with a particular PBG passband into first and second control information associated with different superchannels.

In some implementations consistent with the present disclosure, the node receives first control information associated with a first superchannel and second control information associated with a second superchannel different from the first superchannel. The node may identify a particular PBG passband associated with the different superchannels, and generate control information to be associated with the particular PBG passband. In other implementations consistent with the present disclosure, the node identifies control information associated with a particular PBG passband, identifies different superchannels associated with the particular PBG passband, and separates the control information into control information that is superchannel-specific.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described in the present disclosure may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both.

FIG. 1 generally illustrates an optical link 100. The optical link 100 may include a plurality of nodes. The nodes may be network elements (NEs), as depicted in FIG. 1. In particular, FIG. 1 depicts an add NE 110, an intermediate express NE 140, and a drop NE 170.

The add NE 110 may include a plurality of light sources 112, 114. Each of the light sources 112, 114 may generate light associated with one or more wavelengths within an optical spectrum. The wavelengths generated by a particular light source (for example, any of the plurality of light sources 112, 114) may be associated with a corresponding optical carrier. Each optical carrier may include one or more contiguous optical slices.

A superchannel, which may be abbreviated as "SCH", may include one or more optical carriers sourced from one or more light sources analogous to the light sources 112, 114. In some implementations, the optical carriers included in the superchannel may be managed as a single grouped entity for routing and signaling within an optical network such as the optical link 100.

As depicted in FIG. 1, the light source 112 may generate an optical carrier associated with a superchannel 113 and the light source 114 may generate an optical carrier associated with a superchannel 115. Although only two light sources 112, 114 are depicted in FIG. 1, in will be understood that any number of light sources may be included in the add NE 110, and may be associated with any number of superchannels.

The plurality of light sources 112, 114 may be multiplexed together in a multiplexer module 120 and launched as an optical signal on an optical fiber 130. The optical fiber 130 may carry each of the superchannels 113, 115. The complete optical spectrum carried on the optical fiber 130 may be referred to as a band. Accordingly, the superchannels 113, 115 may compose a portion of the complete band carried in the fiber. For example, the band of the optical fiber 130 may be a C-Band, and L-Band, an Extended-C-Band, or any other suitable band, depending on the fiber used and the supported spectrum.

As the optical signal is carried over long lengths of the optical fiber 130, the optical signal may deteriorate. Accordingly, one or more optical amplifiers may be included in the optical link 100. For example, the optical link 100 depicted in FIG. 1 includes an optical amplifier 132 and a optical amplifier 134 between the add NE 110 and the intermediate express NE 140. The optical link 100 further includes an optical amplifier 136 and an optical amplifier 138 between the intermediate express NE 140 and the drop NE 170.

Each of the optical amplifiers 132, 134, 136, 138 may amplify the whole band of the optical signal. Moreover, the optical amplifiers 132, 134, 136, 138 may amplify the whole band without providing individual power control for a particular superchannel or a particular passband. Depending on the manner in which a particular optical amplifier is deployed, it may include, for example, an erbium-doped fiber amplifier (EDFA) or a Raman amplifier.

If it is necessary to add or drop a superchannel from the band, the optical link 100 may include an intermediate express NE 140. The intermediate express NE 140 may drop one or more superchannels using a demultiplexer module 150 and one or more light sinks. For example, a superchannel 151 may be dropped to the light sink 152. In some implementations, the dropped superchannel 151 may be the same as, for example, the superchannel 113 or the superchannel 115.

The remaining superchannels (the superchannels that are not dropped by the demultiplexer module 150) may be expressed or passed through to the multiplexer module 160. The multiplexer module 160 may add one or more superchannels using one or more light sources. For example, the light source 162 may generate a superchannel 163.

In some implementations, the demultiplexer module 150 and the multiplexer module 160 are similar optical units, in which the direction of the light is different, but the structure of the optical units is similar or the same. In other implementations, the demultiplexer module 150 and the multiplexer module 160 are different optical units.

After the optical signal reaches the drop NE 170, the superchannels may be provided to a demultiplexer module 180 and demultiplexed by the demultiplexer module 180 into superchannels 191, 193. The superchannel 191 may be provided to the light sink 192 and the superchannel 193 may be provided to the light sink 194. The superchannels 191, 193 may each include the data that was modulated at a source end. The data in the superchannel 191 may be extracted at the light sink 192 and the data in the superchannel 193 may be extracted at the light sink 194.

Each of the optical units in the optical link 100, for example, the multiplexer module 120, the demultiplexer module 150, the multiplexer module 160, and the demultiplexer module 180, may have a target optical power associated with each control pass-band. The target optical power must be met so that the optical signal launched at a launch end of an optical fiber is received with sufficient quality at a receiving end of the optical fiber. For example, a minimum signal-to-noise ratio may be required at the receiving end of the optical fiber, and a certain amount of deterioration may be expected based on, for example, the length of the optical fiber. The target optical power at the launch end of the optical fiber may be based on the minimum signal-to-noise ratio (i.e., a ratio of total signal power to the total noise power), the length of the optical fiber, and/or any other suitable variables. To maximize cost effectiveness, the target optical power may be set such that the signal to noise ratio is as low as possible for maximum reach and ensuring that sufficient signal quality is achieved at the receiving end of the optical fiber.

Each optical unit in the optical link 100 may include power control elements that facilitate changing of power levels so as to set the target optical power. For example, the optical amplifiers 132, 134, 136, 138 may include variable optical attenuators and/or adjustable gain. A variable optical attenuator, which may be abbreviated as "VOA", may be a device through which a variable attenuation can be applied to the optical power. The optical amplifiers 132, 134, 136, 138 may target a target optical power value at a band level.

By contrast, the multiplexer modules and the demultiplexer modules (multiplexer module 120, demultiplexer module 150, multiplexer module 160, demultiplexer module 180) may include a control mechanism using a wavelength selective switch, as will be discussed in greater detail below.

Figure 2:
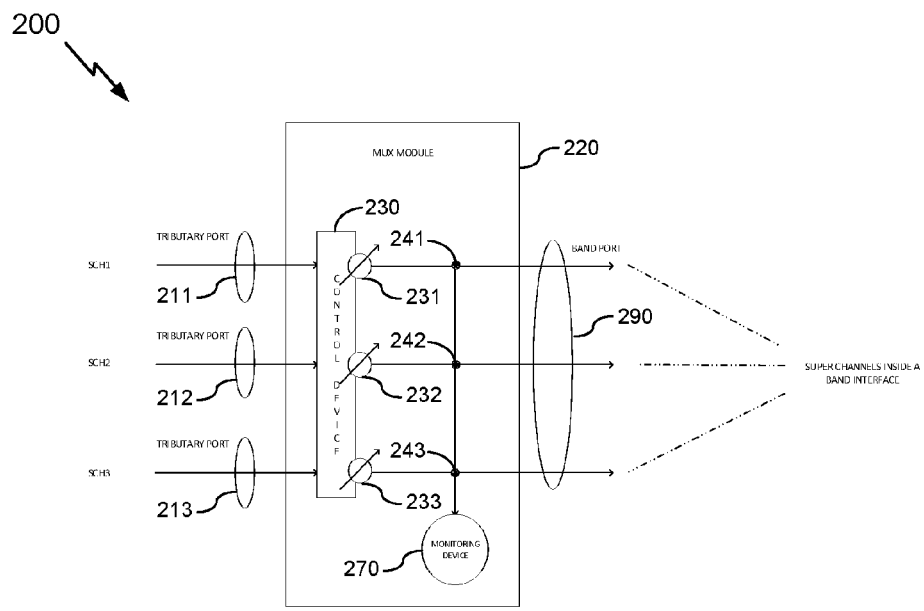
FIG. 2 generally illustrates a node.

FIG. 2 generally illustrates a node, in particular, a multiplexing arrangement 200 using a wavelength selective switch, abbreviated as "WSS". A WSS is a component used in optical communications networks to route or switch optical signals. This routing function of the WSS is performed by coupling one or more optical signals from one or more particular optical ports (for example, input optical ports) to one or more other optical ports (for example, output optical ports). The optical ports may launch/receive the one or more optical signals to/from an optical fiber such as the optical fiber 130.

The multiplexing arrangement 200 may include a plurality of optical ports. The plurality of optical ports may include one or more input ports and one or more output ports. The input ports may include a tributary port 211, a tributary port 212, and a tributary port 213. A superchannel SCH1 may be received on the tributary port 211, a superchannel SCH2 may be received on the tributary port 212, and a superchannel SCH3 may be received on the tributary port 213. Although three superchannels SCH1, SCH2, SCH3 are depicted in FIG. 2, it will be understood that the multiplexing arrangement 200 may facilitate multiplexing of any number of superchannels. Also it may be understood that multiple superchannels can also go through one tributary port using an additional multiplexer for the same.

Each of the tributary ports 211, 212, 213 may be coupled to a multiplexer module 220. The tributary ports 211, 212, 213 may be fiber ports and/or interfaces of the multiplexer module 220.

The multiplexer module 220 may include a control device 230. The control device 230 may receive each of the superchannels provided on the tributary ports 211, 212, 213. A WSS included in the multiplexer module 220 may be configured to route one or more optical signals (or one or more slices thereof) between optical ports of the multiplexer module 220. For example, the WSS may be configured to route the superchannels SCH1, SCH2, and SCH3 to a band port 290. Accordingly, the optical signal on the band port 290 may include each of the superchannels SCH1, SCH2, SCH3.

The WSS may also be used in optical communications networks to control power levels. This power control function of the WSS may be performed by monitoring optical power levels for one or more particular optical signals, determining a target power level for the one or more particular optical signals, and controlling the optical power of the one or more particular optical signals to meet the target power level (for example, amplifying or attenuating the one or more particular optical signals). The optical power at a slice level can be monitored using an OPM (Optical Power Monitor).

The WSS may be associated with a plurality of individually-controllable control passbands. Each control passband may include one or more optical slices. The one or more optical slices included in a particular control passband may be jointly-controllable by the multiplexer module 220.

In some implementations, each control passband may include a single optical slice. As a result, the routing function and the power-control function of the WSS may be performed by the WSS on a slice-by-slice basis. For example, consider an optical spectrum with nine optical slices SLICE1-SLICE9. The WSS may be configured to route and/or power-control an individual slice, for example, SLICE1, from a first optical port to a second optical port while simultaneously routing and/or power-controlling a different slice, for example, SLICE2, from a third optical port to a fourth optical port. Accordingly, each slice may be associated with a single control passband of the WSS.

However, in other implementations, the routing function and the power-control function of the WSS may be limited by hardware constraints. In some implementations, each control passband associated with the WSS may have a minimum width, i.e., a minimum number of contiguous optical slices. For example, the minimum width of the control passband may be three optical slices. For an optical spectrum with nine optical slices SLICE1-SLICE9, a minimum width of three may necessitate joint control of contiguous optical slices SLICE1-SLICE3, joint control of contiguous optical slices SLICE4-SLICE6, and joint control of contiguous optical slices SLICE7-SLICE9. In this example, it will be understood that due to the hardware constraints, individual slices may not be individually-controllable. For example, the WSS may not be able to route control SLICE1 from a first optical port to a second optical port while simultaneously routing SLICE2 from a third optical port to a fourth optical port. Instead, the control passband including SLICE1-SLICE3 is jointly routed and/or power-controlled.

As depicted in FIG. 2, each of the superchannels SCH1, SCH2, SCH3 is associated with a different control passband and therefore may be individually subjected to power control by the WSS of the multiplexer module 220. For example, the superchannel SCH1 may be power-controlled by power controller 231, the superchannel SCH2 may be power-controlled by power controller 232, and the superchannel SCH3 may be power-controlled by power controller 233. It will be understood that the power controllers 231, 232, 233 are schematic representations and need not be distinct components of, for example, the control device 230. The schematic representations of the power controllers 231, 232, 233 are merely provided to indicate the power-control function of the WSS.

FIG. 2 also depicts a power tap 241 associated with the output of the power controller 231, a power tap 242 associated with the output of the power controller 232, and a power tap 243 associated with the output of the power controller 233. The power taps 241, 242, 243 may be monitored by an optical power monitor device 270 to measure slice level powers.

Figure 3:
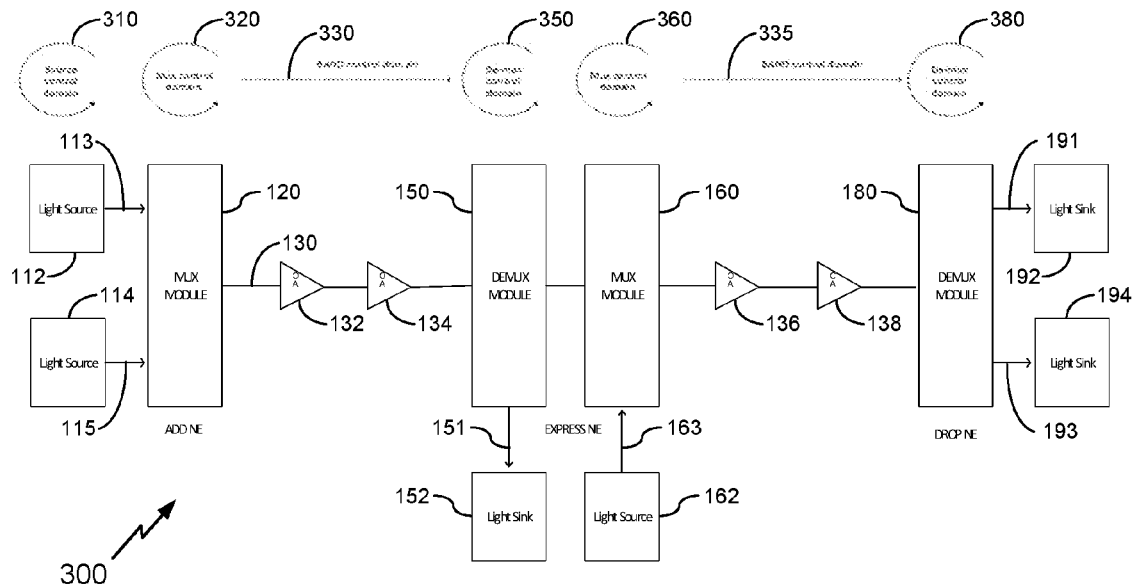
FIG. 3 generally illustrates an optical link having a plurality of control domains.

FIG. 3 generally illustrates a control domain diagram 300 of an optical link analogous to the optical link 100 depicted in FIG. 1. As noted above with respect to FIG. 1, the optical link 100 may include a plurality of components which have been described above. For brevity, the descriptions will not be repeated here.

The control domain diagram 300 includes a plurality of control domains. The light source 112, 114 may be associated with a source control domain 310. The multiplexer module 120 may be associated with a multiplexer control domain 320. One or more of the optical fiber 130, optical amplifier 132, optical amplifier 134, optical amplifier 136, and/or the optical amplifier 138 may be associated with a band control domain 330 and/or a band control domain 335. The demultiplexer module 150 may be associated with a demultiplexer control domain 350. The multiplexer module 160 may be associated with a multiplexer control domain 360. The demultiplexer module 180 may associated with a demultiplexer control domain 380. Multiplexer control domains (analogous to the multiplexer control domains 320, 360) and demultiplexer control domains (analogous to the demultiplexer control domains 350, 380) may be collectively referred to as WSS control domains.

The various control domains depicted in FIG. 3 may be associated with different control resolutions. For example, the source control domain 310 may be associated with a per-carrier or per-superchannel resolution, in which control information may be generated on a per-carrier basis or a per-superchannel basis and control may be performed on a per-carrier basis or a per-superchannel basis. By contrast, the band control domains 330, 335 may be associated with a coarser control resolution, in which control information may be generated on a per-band basis and control may be performed on a per-band basis.

The WSS control domains may be associated with different resolutions, as noted above. By definition, the WSS control domains perform control on the basis of control passbands. However, control passband characteristics may vary across WSS control domains. For example, the multiplexer module 120 depicted in FIG. 1 may have a WSS that can individually route and/or power-control SLICE1 and SLICE2, whereas the demultiplexer module 150 depicted in FIG. 1 may have hardware constraints that necessitate joint routing and/or power-controlling of SLICE1 and SLICE2.

Figure 4:
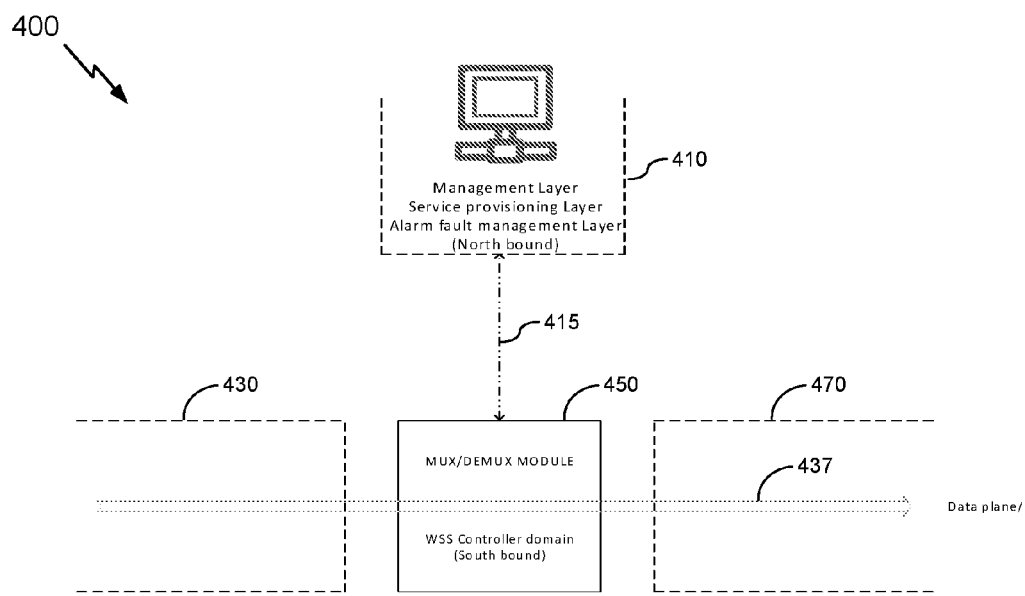
FIG. 4 generally illustrates a control architecture for a node.

FIG. 4 generally illustrates a control architecture 400 for a node analogous to nodes 110, 140, and/or 170 depicted in FIG. 1. The control architecture 400 may include a northbound interface 410, an upstream interface 430, a WSS control domain 450 and a downstream interface 470.

Control information may flow between the WSS control domain 450 and a northbound interface 410. The northbound interface 410 may include a management layer, a service provision layer, an alarm fault management layer, and/or any other suitable northbound layers. The northbound interface 410 may also include a user interface through which, for example, a technician can monitor and/or control the node. The control architecture 400 may include a northbound/southbound control flow 415 that facilitates northbound flow of control information from the WSS control domain 450 to the northbound interface 410 (for example, notifications) and/or a southbound flow of control information from the northbound interface 410 to the WSS control domain 450 (for example, instructions). The southbound control information flow along the northbound/southbound control flow 415 may include control information relating to service provisioning and configuration changes. The northbound control information flow along the northbound/southbound control flow 415 may include control information relating to fault monitoring, alarm monitoring, performance monitoring, and/or status reporting.

The control architecture 400 may further include an upstream interface 430 and a downstream interface 470. FIG. 4 also depicts a data plane flow 437 from the upstream interface 430 to the WSS control domain 450 and from the WSS control domain 450 to the downstream interface 470. The upstream interface 430 may be configured to transmit and/or receive control information from an upstream node (for example, a network element from which an optical signal is received). The downstream interface 470 may be configured to transmit and/or receive control information from a downstream node (for example, a network element to which an optical signal is transmitted).

The control information may include optical parameters like measured power levels, active number of wavelengths, noise levels, and SCH passband count. The control information may be transmitted on a periodic basis and/or a demand basis. For example, a downstream domain may request that an upstream domain provide the latest control information.

The flow of control information within the control architecture 400 may be via an in-band or out-of-band overhead communication channel. As an example, the Optical Supervisory Channel (OSC) may facilitate the flow of control information. The OSC may be an additional wavelength and may be outside the amplification band (for example, at 1510 nm, 1620 nm, 1310 nm, or any other suitable wavelength). The OSC may carry information about the multi-wavelength optical signal as well as remote conditions at the optical add/drop or optical amplifier sites. In Dense Wavelength Division Multiplexing networks (DWDM), the OSC may be used for Operations Administration Maintenance (OAM), which may be a standardized terminology in transport networks used to monitor and manage the network. The OSC may also be a multi-wavelength analogue to SONET's DCC (or supervisory channel).

Figure 5:
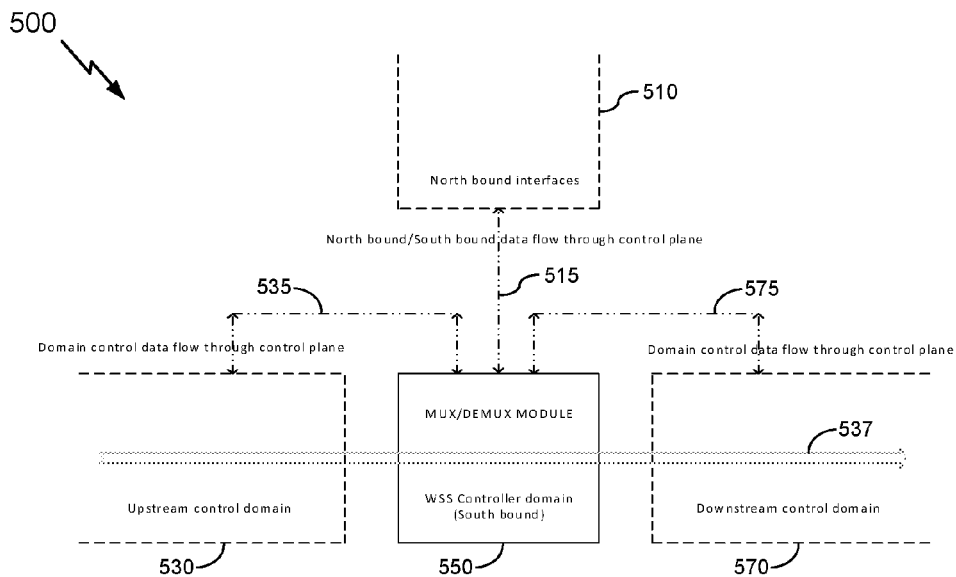
FIG. 5 generally illustrates another control architecture for a node.

FIG. 5 generally illustrates an abstract control architecture 500 for a node analogous to nodes 110, 140, and/or 170 depicted in FIG. 1. The control architecture 500 may be similar in some respects to the control architecture 400 but the flow of control information has been explicitly shown. For example, the control architecture 500 may include a northbound interface domain 510 similar to the northbound interface 410, an upstream interface domain 530 similar to the upstream interface 430, a WSS control domain 550 similar to the WSS control domain 450, and a downstream interface domain 570 similar to the downstream interface 470. The control architecture 500 may further include a northbound/southbound control flow 515 similar to the northbound/southbound control flow 415 and a data plane flow 537 similar to the data plane flow 437. In addition, the control architecture 500 may include an upstream control flow 535 for flow of control information between the upstream interface domain 530 and the WSS control domain 550 and a downstream control flow 575 for flow of control information between the downstream interface domain 570 and the WSS control domain 550.

The control architecture 500 may facilitate the flow of superchannel service provisioning information, superchannel optical control information, superchannel alarms and performance monitoring information, synchronization specific messages, and any other suitable control information.

As will be understood from the foregoing, the WSS control domain 550 may include a wavelength selective switch (WSS). WSSs may be fundamental components of any network that includes reconfigurable optical add/drop multiplexers (ROADM). However, WSSs may be expensive to manufacture and control of WSSs may be restricted by manufacturer-specific limitations.

For example, as noted above, the routing and power control functions of a WSS may be restricted to a set of contiguous slices of the optical spectrum, rather than individual slices. A WSS with a finer granularity may be expensive or difficult to manufacture.

As will be discussed in greater detail below, WSS-related restrictions on the slices that may be routed and/or power-controlled may cause difficulties when attempting to route and/or power-control a particular superchannel using a WSS.

Figure 6:
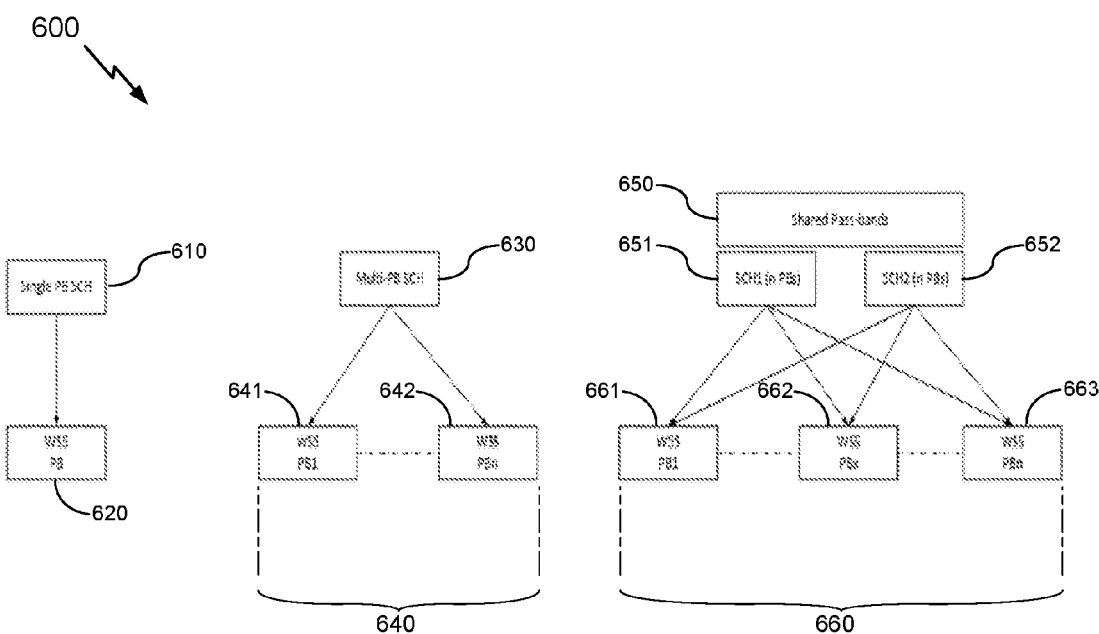
FIG. 6 generally illustrates a series of diagrams for relating superchannels to wavelength selective switch control passbands.

FIG. 6 generally illustrates a series of diagrams 600 for relating superchannels to control passbands. In a first scenario, a superchannel 610 may correspond to a control passband 620 of a WSS. In a second scenario, a superchannel 630 corresponds to a plurality of control passbands 640, the plurality of control passbands 640 including at least a control passband 641 and a control passband 642. In a third scenario, a plurality of superchannels 650 correspond to a plurality of control passbands 660. The plurality of superchannels 650 may include at least a superchannel 651 and a superchannel 652 and the plurality of control passbands 660 may include two or more of a control passband 661, a control passband 662, a control passband 663, and any suitable number of additional control passbands (not shown).

In the first scenario, a control resolution associated with the WSS may not impact the ability of the WSS to control the superchannel 610. In particular, because the superchannel 610 corresponds to a single control passband (the control passband 620), the superchannel 610 may be routed and/or power-controlled using the control passband 620. For example, if the superchannel 610 includes three contiguous optical slices and the control passband 620 has a minimum width of three optical slices, then the superchannel 610 may be routed and/or power-controlled within the WSS by routing and/or power-controlling the control passband 620.

In the second scenario, the control resolution of the WSS may have a greater impact on the ability of the WSS to control the superchannel 630. In particular, because the superchannel 630 corresponds to a plurality of control passbands (the plurality of control passbands 640), any attempt to route and/or power-control the superchannel 630 would necessitate control of both the control passband 641 and the control passband 642. For example, the superchannel 630 may include two non-contiguous set of slices, including a first set of slices disposed in the control passband 641 and a second set of slices disposed in the control passband 642. Accordingly, the superchannel 630 must be routed and/or power-controlled within the WS S by routing and/or power-controlling each of the plurality of control passbands 640.

In the third scenario as well, the control resolution of the WSS may have a greater impact on the ability of the WSS to control the plurality of superchannels 650. In particular, because the plurality of superchannels 650 correspond to a plurality of control passbands (the plurality of control passbands 660), any attempt to route and/or power-control the superchannel 651 would necessitate control of the control passband 661, the control passband 662, and the control passband 663. However, as will be understood from FIG. 6, each of the plurality of control passbands 660 corresponds to a portion of the superchannel 652 as well as the superchannel 651. Accordingly, any attempt to route and/or power-control the superchannel 651 will impact the routing and/or power-controlling of the superchannel 652.

As noted above, any control information, notification, or instruction that is associated with a particular superchannel may also be relevant to other dependent superchannels since both are jointly controlled due to the shared control passbands in the WSS. Moreover, any control information, notification, or instruction that is associated with a particular control passband may be relevant to any number of superchannels.

As will be discussed in greater detail below, a passband group (PBG) is provided that may be used for (1) mapping of superchannels to control passbands and (2) translation of control information, notifications, or instructions. The PBG may have a plurality of PBG passbands, each of which corresponds to a particular control passband. The optical slices associated with each particular superchannel may then be mapped to corresponding PBG passbands. Conceptually, the PBG may exist in a passband abstraction layer (PAL) implemented within the node. The translation may occur as control information passes through the PAL. As will be discussed in greater detail below, the translation may sometimes necessitate the combining of control information associated with different superchannels into combined control information and/or the separating of control information associated with a particular PBG passband into first and second control information associated with different superchannels.

Figure 7:
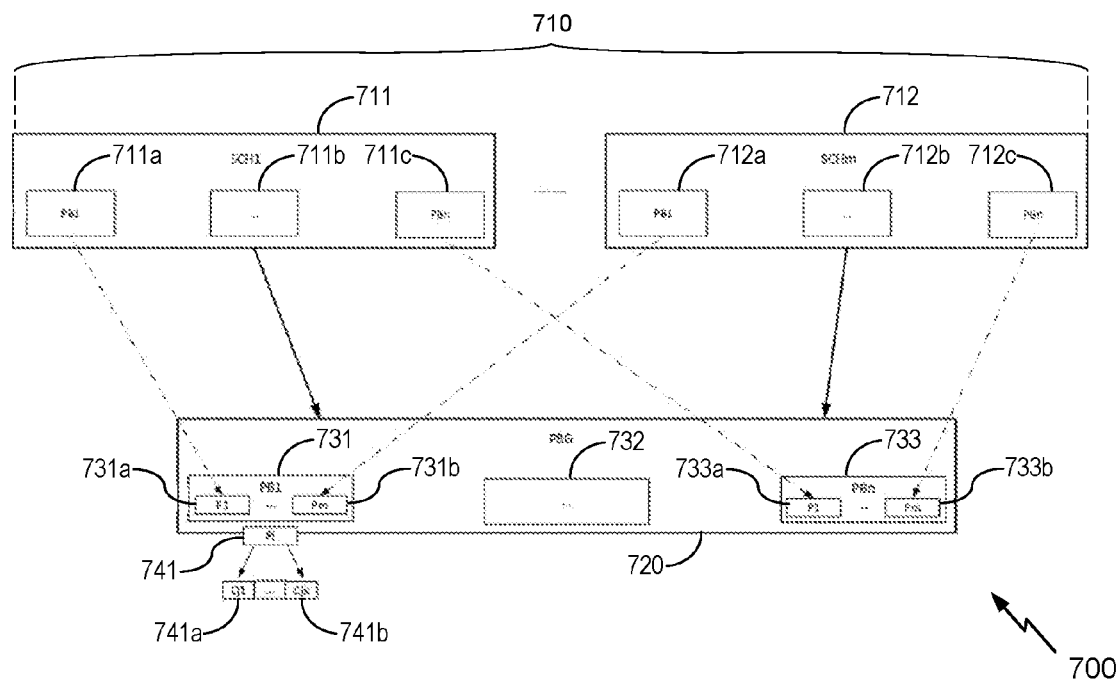
FIG. 7 generally illustrates a diagram for mapping of superchannels to passband groups.

FIG. 7 generally illustrates a diagram 700 for mapping a plurality of superchannels 710 to a PBG 720 (where "PBG" is an abbreviation of "passband group").

The plurality of superchannels 710 may include a superchannel 711 and a superchannel 712. The superchannel 711 may include a plurality of superchannel passbands including a superchannel passband 711a, a superchannel passband 711b, and a superchannel passband 711c. Each of the superchannel passbands 711a, 711b, 711c may include one or more contiguous optical carriers. However, the optical carriers in one superchannel passband (for example, the superchannel passband 711a) may not be contiguous with the optical carriers in any of the other superchannel passbands in the superchannel 711 (for example the superchannel passband 711b and the superchannel passband 711c).

The superchannel 712 may be analogous to the superchannel 711. For example, the superchannel 712 may include a superchannel passband 712a, a superchannel passband 712b, and a superchannel passband 712c, and each of the superchannel passbands 712a, 712b, 712c may include one or more contiguous optical carriers. The optical carriers in, for example, the superchannel passband 712a may not be contiguous with the optical carriers in the superchannel passband 712b or the superchannel passband 712c.

The PBG 720 may be a map that relates particular superchannel passbands from particular superchannels (for example, the superchannel 711 and the superchannel 712) to particular control passbands associated with the WSS. The PBG 720 may be determined by a processor associated with the node, as will be discussed in greater detail below.

The PBG 720 may include a plurality of PBG passbands, for example, a PBG passband 731, a PBG passband 732, and a PBG passband 733. Each of the plurality of PBG passbands 731, 732, 733 may be associated with a particular control passband of the WSS. As noted above, the control passbands may be subject to hardware constraints, for example, each control passband may have a minimum width, i.e., a minimum number of contiguous optical slices.

FIG. 7 depicts a scenario wherein, due to hardware constraints, the control passbands associated with a particular WSS each include optical carriers associated with a plurality of superchannels. Accordingly, the PBG 720 is determined such that each control passband of the WSS corresponds to a particular PBG passband in the PBG 720. For example, the PBG passband 731 may correspond to a first control passband of the WSS, the PBG passband 732 may correspond to a second control passband of the WSS, and the PBG passband 733 may correspond to a third control passband of the WSS.

As will be understood from FIG. 7, each PBG passband may include one or more partitions. For example, the PBG passband 731 may include a PBG passband partition 731a and a PBG passband partition 731b. Moreover, the PBG passband 733 may include a PBG passband partition 733a and a PBG passband partition 733b.

A particular partition within a PBG passband may correspond to one or more optical carriers associated with a particular superchannel. As depicted in FIG. 7, the PBG passband partition 731a may correspond to the superchannel passband 711a of the superchannel 711 and the PBG passband partition 731b may correspond to the superchannel passband 712a of the superchannel 712. Moreover, the PBG passband partition 733a may correspond to the superchannel passband 711c of the superchannel 711 and the PBG passband partition 733b may correspond to the superchannel passband 712c of the superchannel 712.

To further illustrate the components of the PBG 720, a PBG passband partition 741 is depicted. The PBG passband partition 741 may be analogous to the PBG passband partition 731a and/or the PBG passband partition 731b. The PBG passband partition 741 includes one or more optical carriers associated with a particular control passband. For example, the PBG passband partition 741 may include a plurality of optical carriers including an optical carrier 741a and an optical carrier 741b.

The PBG 720 may be used to map particular superchannels (or portions thereof) to particular control passbands of the WSS. Once the PBG 720 has been determined, it can be used to determine, for example, which portions of which superchannels correspond to a particular control passband of the WSS. Accordingly, the PBG 720 can be used to translate control information that is denominated in terms of a particular control passband of the WSS into control information that is denominated in terms of one or more corresponding superchannels.

The PBG 720 can also be used to determine, for example, which control passbands of the WSS correspond to one or more portions of a particular superchannel. Accordingly, the PBG 720 can be used to translate control information that is denominated in terms of the particular superchannel into control information that is denominated in terms of one or more corresponding control passbands of the WSS.

Figure 8:
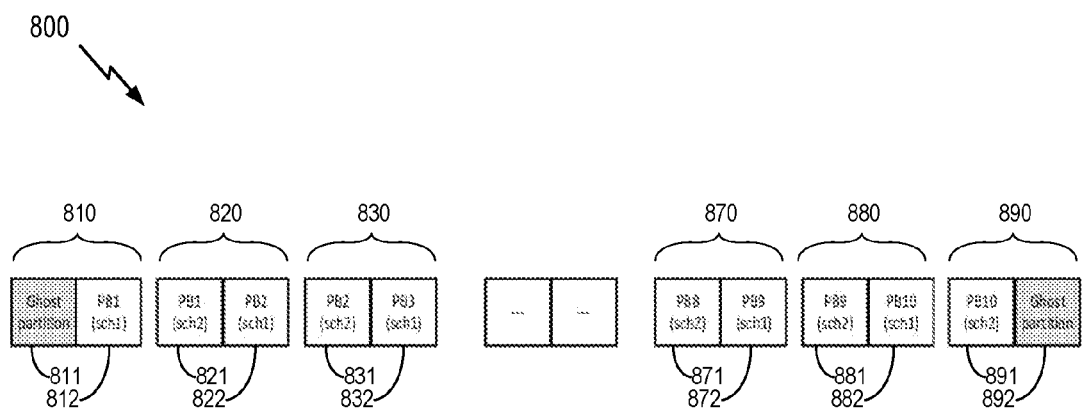
FIG. 8 generally illustrates a diagram for mapping a plurality of partitions within a respective plurality of PBG passbands.

FIG. 8 generally illustrates a diagram 800 for mapping a plurality of partitions within a respective plurality of PBG passbands. In particular, the diagram depicts an example where the superchannels are staggered leading to creation of ghost partitions.

The plurality of PBG passbands depicted in FIG. 8 may be analogous to the PBG passband 731, PBG passband 732, and PBG passband 733 depicted in FIG. 7. The plurality of PBG passbands depicted in FIG. 8 may be included in a PBG analogous to the PBG 720 depicted in FIG. 7. The plurality of PBG passbands may include a PBG passband 810, a PBG passband 820, and a PBG passband 830. The plurality of PBG passbands may further include a PBG passband 870, a PBG passband 880, and a PBG passband 890, with any number of PBG passbands there between.

As noted above with respect to FIG. 7, each PBG passband may be mapped so as to correspond to a particular control passband of a WSS. Each PBG passband may include any suitable number of partitions.

As depicted in FIG. 8, the PBG passband 810 may be mapped such that it includes a PBG passband partition 811 and a PBG passband partition 812. The PBG passband partition 812 may be associated with a first superchannel. Due to hardware constraints, the control passband with which the PBG passband 810 is associated may include additional optical slices other than the optical slices associated with the first superchannel. Accordingly, the mapping may include creation of a ghost partition corresponding to the PBG passband partition 811. The ghost partition may include one or more optical slices that are jointly controlled along with the optical slices that are included in the PBG passband partition 812, but are not associated with a particular superchannel.

As further depicted in FIG. 8, the PBG passband 820 may be mapped such that it includes a PBG passband partition 821 and a PBG passband partition 822. The PBG passband partition 821 may be associated with a second superchannel and the PBG passband partition 822 may be associated with the first superchannel with which the PBG passband partition 812 is associated.

As further depicted in FIG. 8, the PBG passband 830 may be mapped such that it includes a PBG passband partition 831 and a PBG passband partition 832. Moreover, the PBG passband 870 may be mapped such that it includes a PBG passband partition 871 and a PBG passband partition 872, the PBG passband 880 may be mapped such that it includes a PBG passband partition 881 and a PBG passband partition 882, and the PBG passband 890 may be mapped such that it includes a PBG passband partition 891 and a PBG passband partition 892. As will be understood from FIG. 8, each of the PBG passband partition 812, the PBG passband partition 822, the PBG passband partition 872, and the PBG passband partition 882 may be associated with the first superchannel, and each of the PBG passband partition 821, the PBG passband partition 831, the PBG passband partition 871, the PBG passband partition 881, and the PBG passband partition 891 may be associated with the second superchannel. The PBG passband partition 892 may be a ghost partition analogous to the PBG passband partition 811. As can be understood the ghost partitions can be in any of the PBG's passbands depending on which first superchannel's passband is not coupled with second superchannel's passband.

Figure 9:
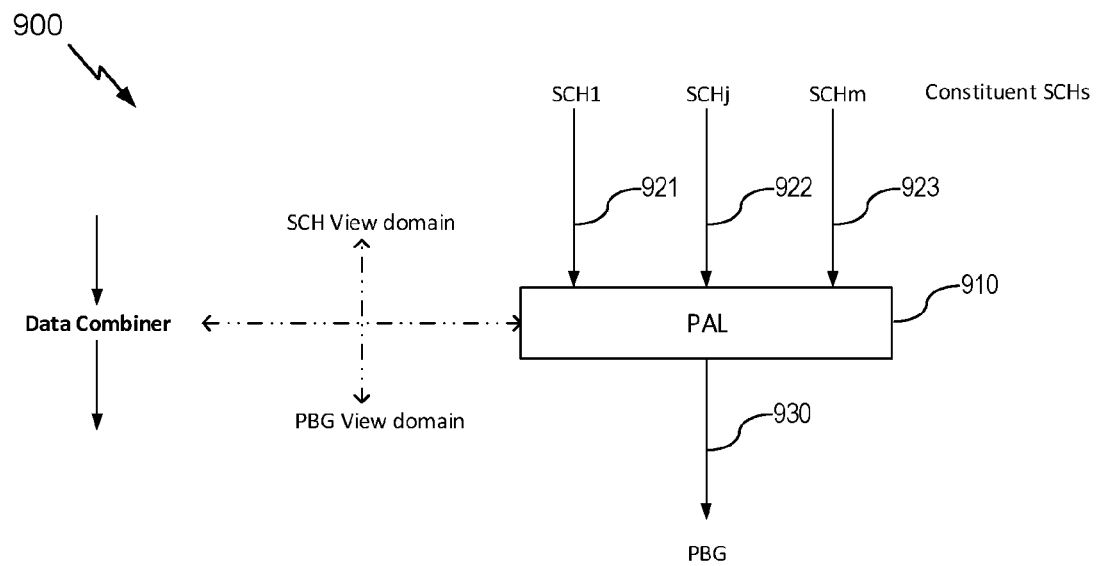
FIG. 9 generally illustrates a passband abstraction layer (PAL) diagram showing a PAL module that performs a control information combining operation.

FIG. 9 generally illustrates a passband abstraction layer (PAL) diagram 900 showing a PAL module 910 that performs a control information combining operation.

The PAL module 910 may be implemented as a computing device. For example, the PAL module 910 may implemented as an ASIC or may be implemented using one or more components of an ASIC. Additionally or alternatively, the PAL module 910 may be implemented as instructions stored on a computer-readable storage medium and executed using one or more processors. In some implementations, the computer-readable storage medium may be a non-transitory computer-readable storage medium.

As will be discussed in greater detail below with respect to FIG. 11, the PAL module 910 may be configured to perform a control information combining operation by receiving first superchannel control information 921 associated with a first superchannel, second superchannel control information 922 associated with a second superchannel, and third superchannel control information 923 associated with a third superchannel. The PAL module 910 may be further configured to perform the control information combining operation by combining the superchannel control information 921, 922, 923 into PBG passband control information 930 associated with one or more particular PBG passbands. The particular PBG passbands may be analogous to the PBG passbands included in a PBG analogous to the PBG 720.

Although the control information combining operation is depicted in FIG. 9 in terms of three superchannels, it will be understood that the control information combining operation may be performed in terms of any suitable number of superchannels.

Figure 10:
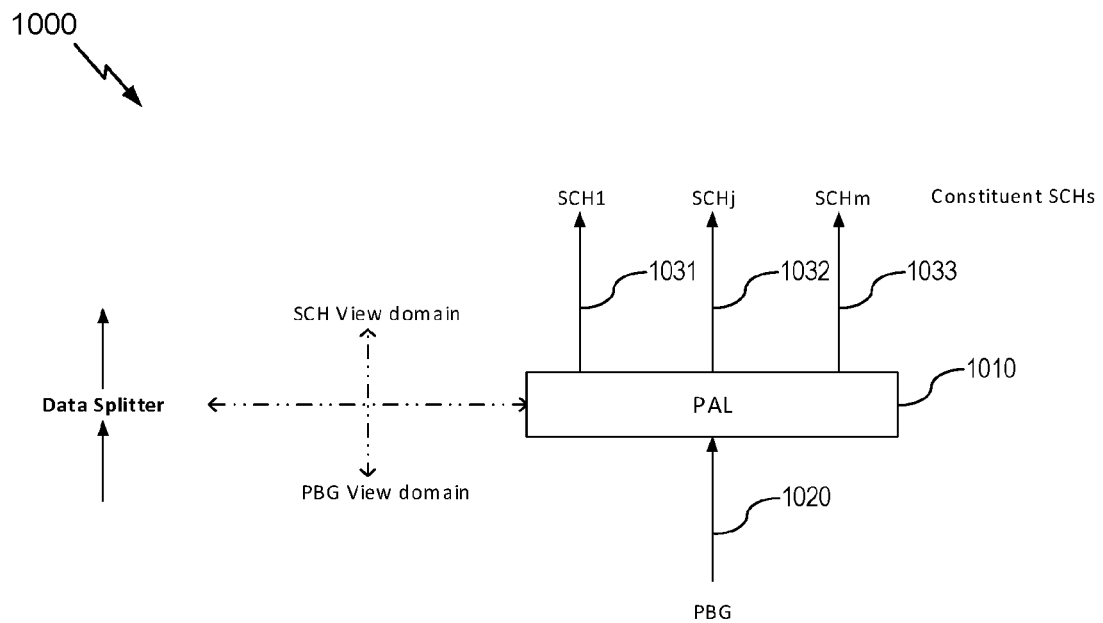
FIG. 10 generally illustrates a passband abstraction layer (PAL) diagram showing a PAL module that performs a control information separating operation.

FIG. 10 generally illustrates a passband abstraction layer (PAL) diagram 1000 showing a PAL module 1010 that performs a control information separating operation.

The PAL module 1010 may be implemented as a computing device analogous to the PAL module 910. It will be further understood that a single PAL module may be configured to perform both the combining operations of the PAL module 910 and the separating operations of the PAL module 1010.

As will be discussed in greater detail below with respect to FIG. 11, the PAL module 1010 may be configured to perform a control information separating operation by retrieving PBG passband control information 1020 associated with one or more particular PBG passbands. The particular PBG passbands may be analogous to the PBG passbands included in a PBG analogous to the PBG 720. The PAL module 1010 may be further configured to perform the control information separating operation by separating the PBG passband control information 1020 into first superchannel control information 1031 associated with a first superchannel, second superchannel control information 1032 associated with a second superchannel, and third superchannel control information 1033 associated with a third superchannel.

Although the control information separating operation is depicted in FIG. 10 in terms of three superchannels, it will be understood that the control information separating operation may be performed in terms of any suitable number of superchannels.

Figure 11:
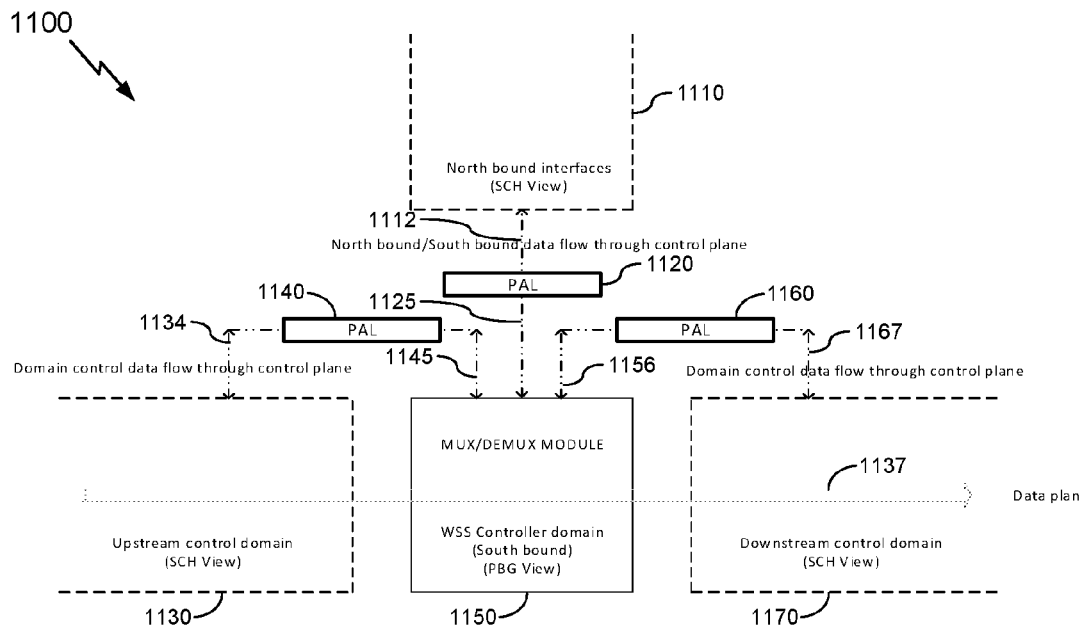
FIG. 11 generally illustrates yet another control architecture for a network element.

FIG. 11 generally illustrates a control architecture 1100 for a node analogous to nodes 110, 140, and/or 170 depicted in FIG. 1. The control architecture 1100 may be similar in some respects to the control architecture 400 and/or the control architecture 500 depicted in FIGS. 4-5. For example, the control architecture 1100 may include a northbound interface domain 1110 similar to the northbound interface domain 510, an upstream interface domain 1130 similar to the upstream interface domain 530, a WSS control domain 1150 similar to the WSS control domain 550, and a downstream interface domain 1170 similar to the downstream interface domain 570. Also depicted in FIG. 11 is a data plane flow 1137 similar to the data plane flow 537.

The control architecture 1100 may further include a northbound/southbound control flow similar to the northbound/southbound control flow 515, however, a PAL module 1120 may be interposed between the northbound interface domain 1110 and the WSS control domain 1150 such that that the northbound/southbound control flow is separated into a northbound/southbound control flow 1112 and a northbound/southbound control flow 1125. The PAL module 1120 may be configured to translate control information using a PBG such as the PBG 720 depicted in FIG. 7.

The control architecture 1100 may further include an upstream control flow similar to the upstream control flow 535, however, a PAL module 1140 may be interposed between the upstream interface domain 1130 and the WSS control domain 1150 such that that the upstream control flow is separated into an upstream control flow 1134 and an upstream control flow 1145. The PAL module 1140 may be configured to translate control information using a PBG such as the PBG 720 depicted in FIG. 7.

The control architecture 1100 may further include a downstream control flow similar to the downstream control flow 575, however, a PAL module 1160 may be interposed between the downstream interface domain 1170 and the WSS control domain 1150 such that that the downstream control flow is separated into a downstream control flow 1156 and a downstream control flow 1167. The PAL module 1160 may be configured to translate control information using a PBG such as the PBG 720 depicted in FIG. 7.

Although FIG. 11 depicts three distinct PAL modules 1120, 1140, 1160 interposed between the WSS control domain 1150 and the other control domains 1110, 1130, 1170, it will be understood that the PAL modules 1120, 1140, 1160 may be implemented as a single module configured to perform all of the operations performed separately by the PAL modules 1120, 1140, 1160. Additionally or alternatively, the PAL modules 1120, 1140, 1160 may be implemented as a controller similar to the controller 1820 depicted in FIG. 18 and described below, and/or the processor 1821 and memory 1822 depicted in FIG. 18 and described below.

FIGS. 12-16 depict a PAL module architecture 1200 of a PAL module analogous to the PAL module 1120, the PAL module 1140, and/or the PAL module 1160. The PAL module architecture 1200 is constructed in such a way that irrespective of WSS limitations or in general due to any hardware level restrictions and spectrum allocations, the various control domains within the optical system (northbound interface domain 1110, upstream interface domain 1130, WSS control domain 1150, downstream interface domain 1170) remain unchanged. All spectrum related details and device level restrictions are reflected in the PAL module architecture 1200 itself and the other components in the system remain unchanged. This design gives a flexibility and scalability which works seamlessly for any kind of device and any kind of superchannel spectrum allocation.

For example, within the WSS control domain 1150, the WSS understands the generalized notion of the PBG and its associated PBG passbands and partitions. The WSS control domain is written in a generic way which can handle a PBG composed of N passbands (i.e., any number of passbands) and M partitions (i.e., any number of partitions), any number of which may be ghost partitions (analogous to the PBG passband partition 811 and/or the PBG passband partition 892). PBG objects are formed based on rules encoded within the PAL module architecture 1200, which depends on WSS hardware constraints and spectrum allocation of the superchannels. Hence, the PAL module architecture 1200 can generate PBG objects which can be different for different kinds of WSSs and spectrum allocations. Since the WSS control domain has a generalized notion of the PBG and is written generically to handle N passbands, M partitions and any number of ghost partitions, the WSS control domain remains unchanged. Since the other control domains (northbound interface domain 1110, upstream interface domain 1130, and downstream interface domain 1170) have a superchannel view (which is already independent of WSS hardware constraints and spectrum limitations), components in these other control domains may also remain unchanged. The only layer that accommodates the differences between the PBG view and the superchannel view is the passband abstraction layer (PAL) managed by the PAL module architecture 1200.

Figure 12:
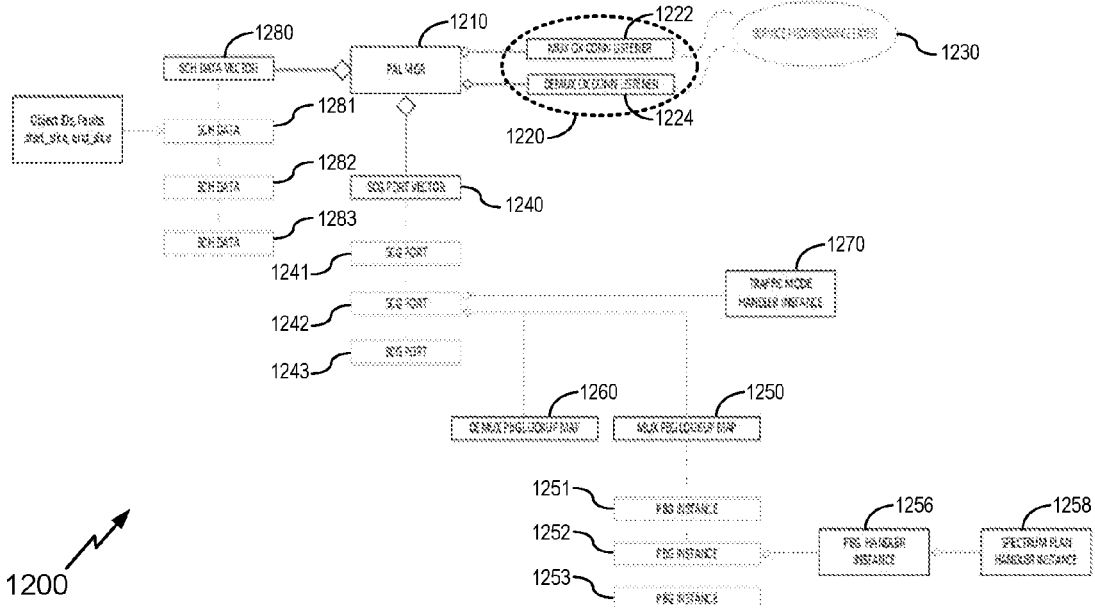
FIG. 12 generally illustrates a PAL module architecture.

FIG. 12 generally illustrates a PAL module architecture 1200. The PAL module architecture 1200 may include a base class which may include a PAL manager 1210. The PAL manager 1210 may include handles to objects, the objects including ox-conn listeners 1220. The ox-conn listeners 1220 may include a multiplexer ox-conn listener 1222 and a demultiplexer ox-conn listener 1224, which listen to the ox-conn configurations performed in the service provisioning layer 1230. The service provisioning layer 1230 may be a northbound layer similar to, for example, the northbound interface domain 510 and or the northbound interface domain 1110. The service provision layer 1230 sends information of the mux and de-mux ox-conns creations and deletions associated with a superchannel to the PAL module architecture 1200.

An ox-conn is an association of the superchannel between an SCG port associated with a WSS and a BAND port associated with the WSS. The abbreviation SCG may refer to a super channel group, and may be similar to a tributary port such as the tributary port 211, the tributary port 212, and/or the tributary port 213 depicted in FIG. 2. Multiple superchannels may be provided on a particular SCG port.

FIG. 12 depicts a SCG port vector 1240 associated with a SCG port 1241, a SCG port 1242, and a SCG port 1243. The SCG port 1241, the SCG port 1242, and the SCG port 1243 may be ingress ports of the WSS and the BAND port may be an egress port of the WSS. The lifecycle of the superchannel object may be tied to the ox-conn object. The SCG port vector 1240 associated with the SCG ports in the WSS may be maintained by the PAL manager 1210.

For each of the SCG ports 1241, 1242, 1243, the associated ox-conn created by the user in the northbound layer leads to creation of a PBG instance which is stored in the multiplexer PBG lookup map 1250 and/or the demultiplexer PBG lookup map 1260. It will be understood that there may be many ox-conns created on a SCG port. FIG. 12 depicts a PBG instance 1251, a PBG instance 1252, and a PBG instance 1253 associated with the multiplexer PBG lookup map 1250, however, it will be understood that any number of PBG instances may be associated with the multiplexer PBG lookup map 1250 and/or the demultiplexer PBG lookup map 1260.

The superchannel associated with a particular ox-conn is stored in a separate SCH data vector 1280. The SCH data vector 1280 may contain, for each superchannel, data including an object ID and cache the faults and configurations information (for example, start slice and end slice for each of the passbands of the superchannel). FIG. 12 depicts a SCH data 1281, a SCH data 1282, and a SCH data 1283, however, it will be understood that the SCH data vector 1280 may include data on any number of superchannels.

As further depicted in FIG. 12, the PBG instance 1252 may include a handle to a PBG handler instance 1256 which maintains six utility functions (for example, 'gets' and 'puts'). The utility functions may be invoked in the context of control data exchanges between a WSS and other control domains (for example, upstream, downstream, and northbound). The PBG handler instance 1256 also has a handle to a spectrum plan handler instance 1258 which has rules for a superchannel spectrum allocation. The superchannel spectrum allocation may be invoked in the context of data exchange functions. How the PBG object is generated for a superchannel with a particular spectrum allocation and a particular device with restrictions which is meant for the WSS domain controller, is defined in the WSS-specific and spectrum-specific derived spectrum plan handler based on the rules. Since an SCG port mode can be different for express and add/drop configurations, the rules which are specific to add/drop and express mode may also be defined in the derived traffic mode handler instance 1270. These specific derived functions are invoked in the context of data exchanges happening from and to the WSS domain controller.

Figure 13:
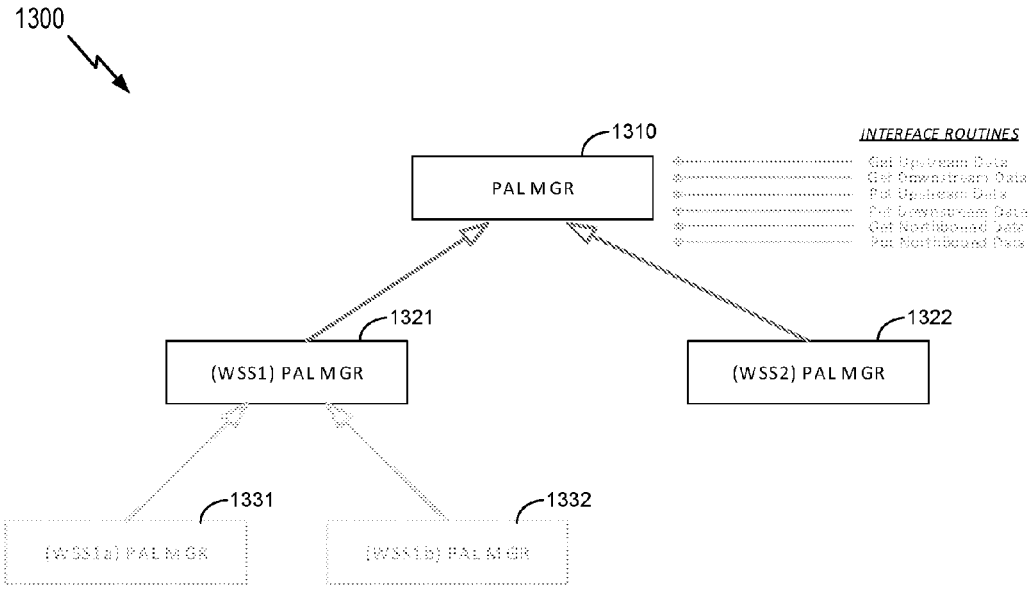
FIG. 13 generally illustrates a derived implementation of a PAL manager.

FIG. 13 generally illustrates a derived implementation 1300 of a PAL manager 1310 based on different kinds of WSS. The PAL manager 1310 may be analogous to, for example, the PAL manager 1210 depicted in FIG. 12. As noted above, different WSSs may be associated with different hardware constraints. For example, the minimum number of contiguous slices per control passband may be restricted, unrestricted, or restricted to a particular minimum number of slices. Accordingly, the PAL manager 1310 may include abstract or virtual utility functions which can have derived implementations for different WSSs associated with the different hardware constraints. For example, the derived PAL manager 1321 may include utility functions for a WSS associated with a first set of hardware constraints and the derived implementation 1322 for a WSS associated with a second set of hardware constraints. As depicted in FIG. 13, there may be additional variations based on further hardware constraints. For example, the derived implementation 1321 may further have a derived implementation 1331 associated with a first subset of the first set of hardware constraints and derived implementation 1332 associated with a second subset of the first set of hardware constraints.

The six utility functions defined in the base class of the PAL manager 1310 may be pure virtual functions which are implemented in a WSS-specific derived PAL MGR class. Whenever there is a data exchange required between components in a WSS control domain (analogous to the WSS control domain 1150) and components in other control domains (analogous to the northbound interface domain 1110, the upstream interface domain 1130, and the downstream interface domain 1170) the functions may be invoked accordingly. Based on an SCG port (analogous to the SCG port 1241, the SCG port 1242, and/or the SCG port 1243) being added, dropped, or expressed, the specific derived class function of the traffic mode handler instance 1270 is invoked which has the port mode-based rules defined and hence constructs the control data. For example, the control data may be mapped, converted, or translated from superchannel-based format to PBG-based format or vice-versa. Hence, for each of the utility functions of the PAL manager 1310, there are one to one mapped utility functions defined in the traffic mode handler instance 1270 for each SCG port. In some cases, where the port mode being add/drop or express mode is immaterial, the utility functions of the PBG handler instance 1256 may be called directly in the context of the PAL manager 1310 utility functions. Hence, for each of the utility functions in the PAL manager 1310, there is also a one to one mapped utility function defined in the PBG handler class. Hence, the six utility functions are defined in the PBG handler instance 1256 and also have a derived implementation based on the kind of the WSS and the mux or the de-mux direction.

Figure 14:
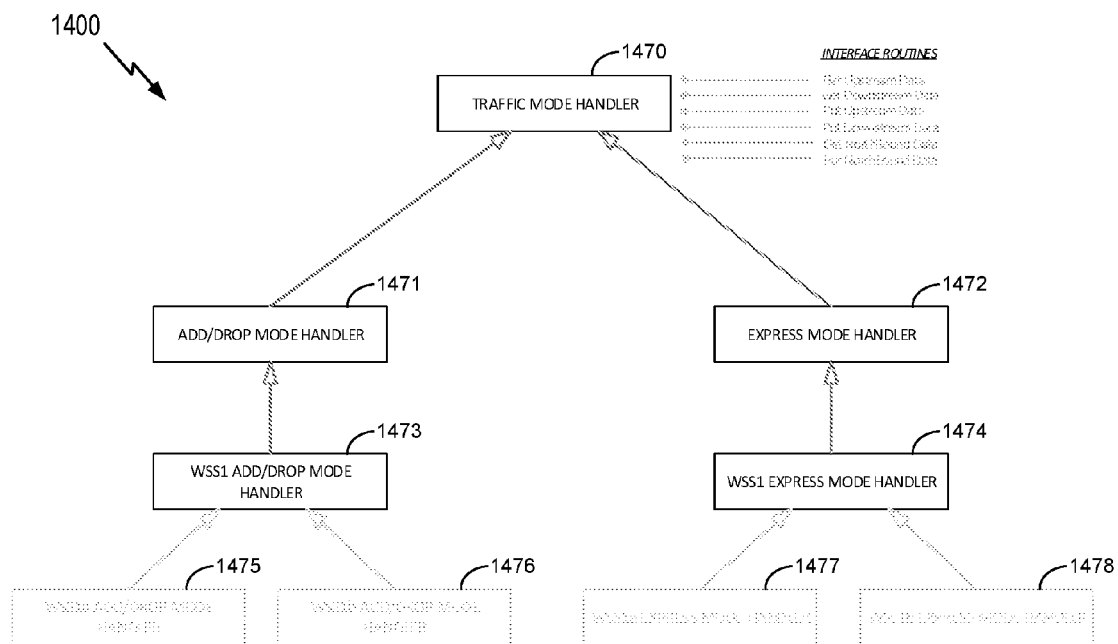
FIG. 14 generally illustrates a derived implementation of a traffic mode handler.

FIG. 14 generally illustrates a derived implementation 1400 of a traffic mode handler 1470 analogous to the traffic mode handler instance 1270 depicted in FIG. 12. The derived traffic mode handler 1470 may be based on the SCG port mode (add/drop or express). Accordingly, the traffic mode handler 1470 may be derived to include an add/drop mode handler 1471 and an express mode handler 1472. For each of the add/drop mode handler 1471 and the express mode handler 1472, different rules may be maintained based on different WS S hardware constraints. Accordingly, the add/drop mode handler 1471 may include utility functions be derived to 1473 for a WSS associated with a first set of hardware constraints, including utility functions further derived to 1475 for a WSS associated with a first subset of the first set of hardware constraints and utility functions derived to 1476 for a WSS associated with a second subset of the first set of hardware constraints. Similarly, the express mode handler 1472 may include utility functions be derived to 1474 for a WSS associated with a second set of hardware constraints, including utility functions further derived to 1477 for a WSS associated with a first subset of the second set of hardware constraints and utility functions derived to 1478 for a WSS associated with a second subset of the second set of hardware constraints. Each of the six utility functions may be concretely defined in the most derived class.

Figure 15:
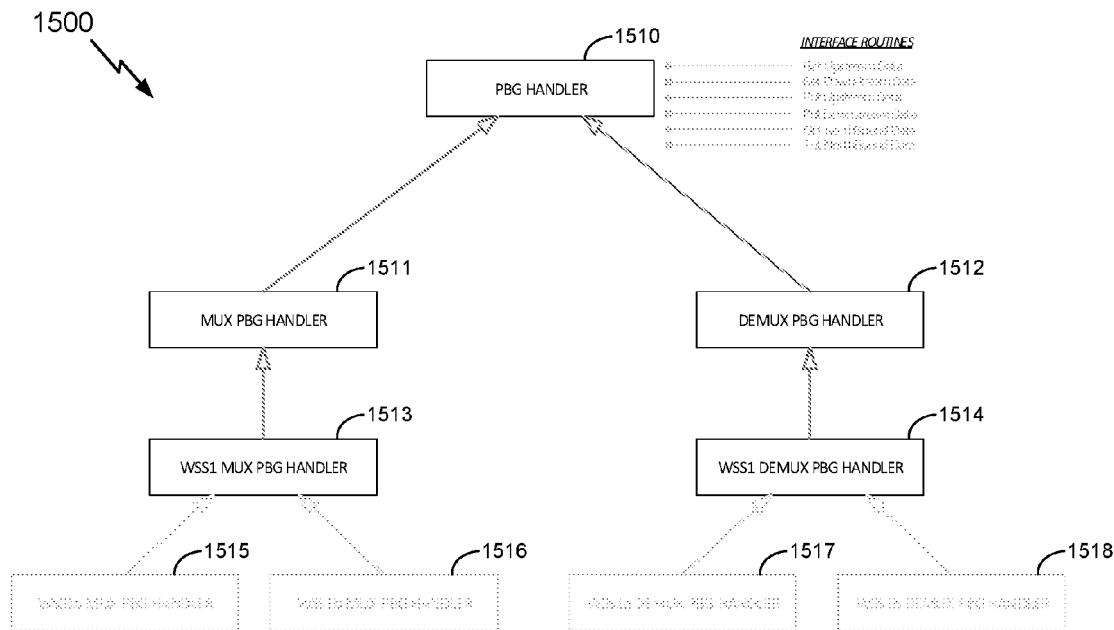
FIG. 15 generally illustrates a derived implementation of a PBG handler instance.

FIG. 15 generally illustrates a derived implementation 1500 of a PBG handler instance 1510 analogous to the PBG handler instance 1256 depicted in FIG. 12. The PBG handler instance 1510 may be associated with a multiplexer direction (as in FIG. 12) or a demultiplexer arrangement (not shown). If the PBG handler instance 1510 is associated with a multiplexer direction, then the rules may be maintained at a multiplexer PBG handler instance 1511 and if the PBG handler instance 1510 is associated with a demultiplexer arrangement, then the rules may be maintained at a demultiplexer PBG handler instance 1512. If the rules maintained in the multiplexer PBG handler instance 1510 or the demultiplexer PBG handler instance 1512 are different due to WSS hardware constraints, then there are further derived classes based on the kinds of WSS. For example, the multiplexer PBG handler instance 1511 may include utility functions be derived to 1515 for a WSS associated with a first set of hardware constraints and utility functions derived to 1516 for a WSS associated with a second set of hardware constraints. Similarly, the demultiplexer PBG handler instance 1512 may include utility functions be derived to 1517 for a WSS associated with a first set of hardware constraints and utility functions derived to 1518 for a WSS associated with a second set of hardware constraints. Each of the six utility functions may be concretely defined in the most derived class.

Figure 16:
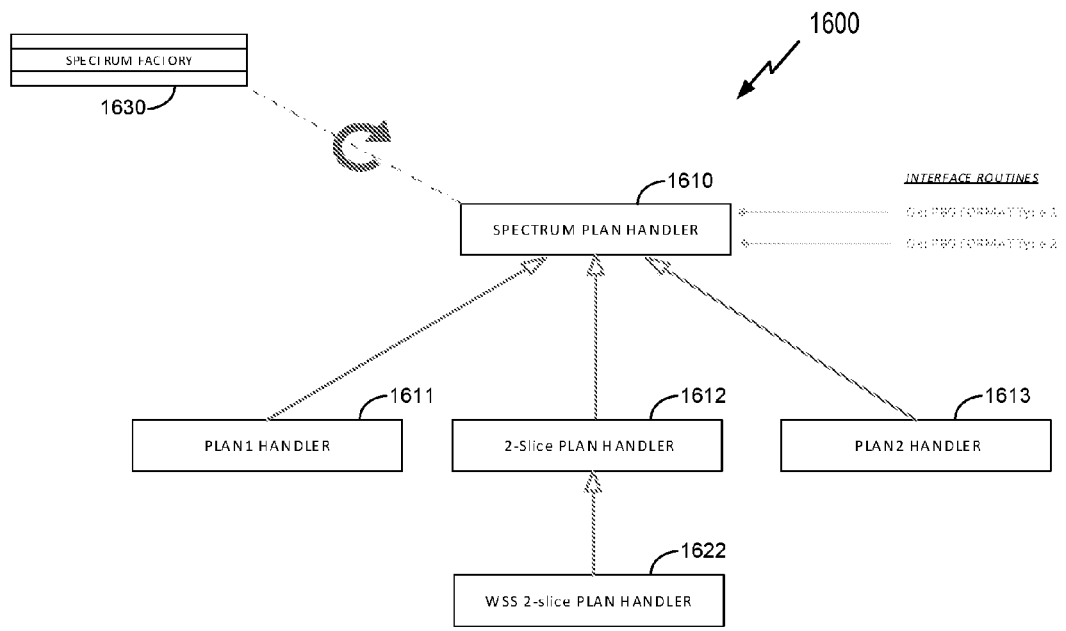
FIG. 16 generally illustrates a derived implementation of a spectrum plan handler instance.

FIG. 16 generally illustrates a derived implementation 1600 of a spectrum plan handler instance 1610 analogous to the spectrum plan handler instance 1258 depicted in FIG. 12. The spectrum plan handler instance 1610 may be based on different kinds of superchannel spectrum. The superchannel spectrum plan handler instance may originate from, for example, a spectrum factory 1630 (in accordance with the factory-design pattern). For example, the spectrum plan handler instance 1610 may include a plan-1 handler 1611, a 2-slice handler 1612, a plan-2 handler 1613, or any other suitable handlers. These derived classes are again further derived to the next level based on WSS hardware constraints. For example, the 2-slice handler 1612 may be derived include classes derived to a next level 1622 based on a first set of WSS hardware constraints. As will be understood from the foregoing, the first set of WSS hardware constraints may include additional subsets in some implementations. Moreover, the plan-1 handler 1611 and the plan-2 handler 1613 may include further derivations based on WSS hardware constraints. Hence, based on the spectrum and WSS constraints, a PBG object may be constructed out of a superchannel object. Accordingly, the spectrum plan handler instance 1610 may be configured to perform a 'get PBG format' function that takes the superchannel object as an input and provides the PBG object based on the input, the spectrum, and the WSS hardware constraints. The PBG object generated by the spectrum plan handler instance 1610 is reported to a WSS control domain (analogous to the WSS control domain 1150). The PBG object may be used to create a PBG passband in the WSS. In this way, the WSS control domain is kept agnostic to the spectrum or device specific details based on which the PBG object is created. Instead, the WSS control domain manages the PBG passband within the WSS device and performs optical controls thereon. The particularities of how a particular PBG passband is created is in embedded within the PAL layer itself (implemented using, for example, the PAL module 1120, the PAL module 1140, and/or the PAL module 1160). Similarly with respect to flow of control data from and to the other control domains (analogous to the northbound interface domain 1110, the upstream interface domain 1130, and the downstream interface domain 1170), the rules and logic to combine or separate the data of different SCHs is embedded inside the PAL's utility functions (the 'gets' and 'puts'). The WSS control domain 1150 may only use control information having a PBG format, while the PAL determines how the control information used by the WSS control domain 1150 is combined from or separated to distinct superchannels.

Figure 17:
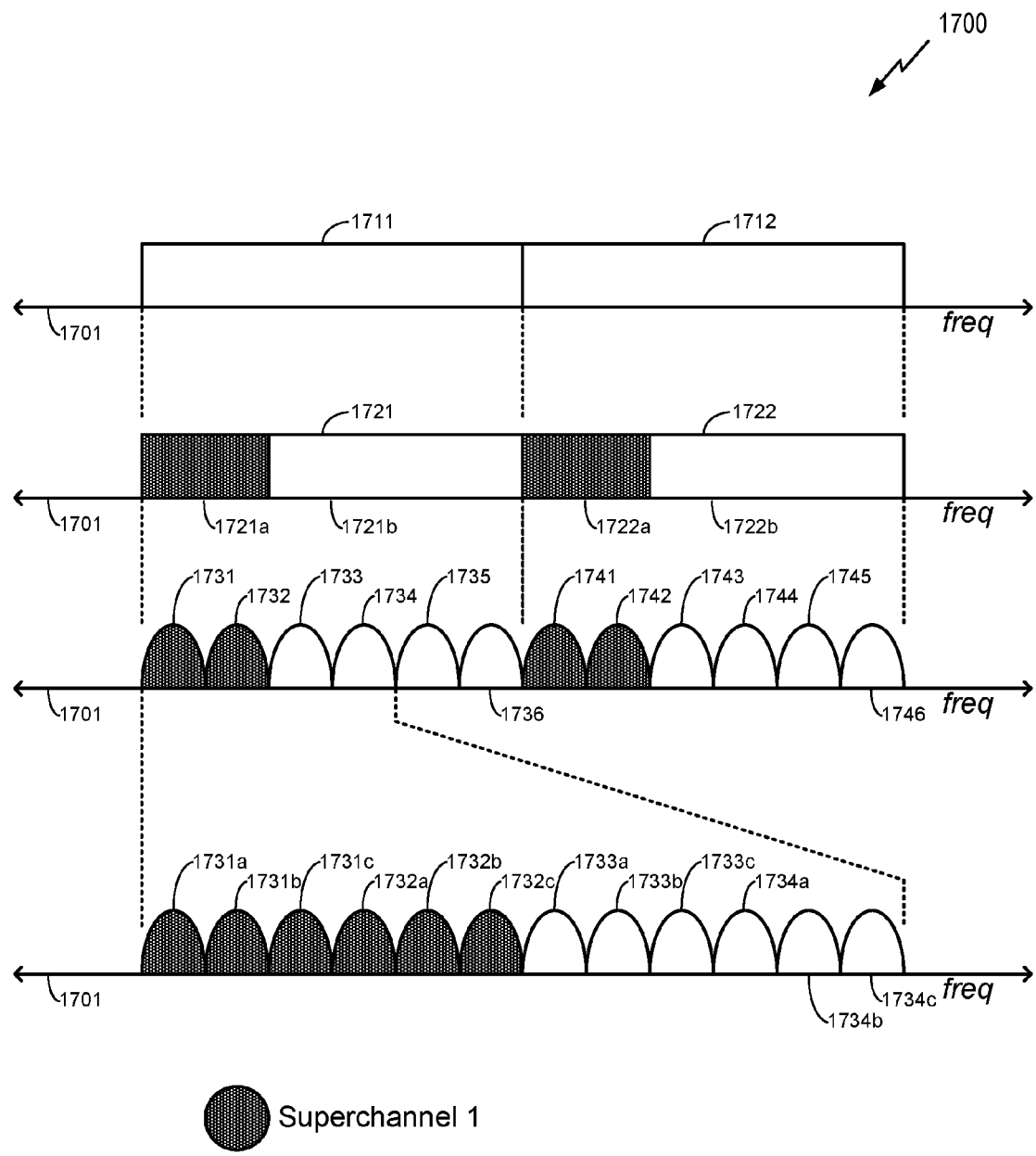
FIG. 17 generally illustrates a diagram for mapping of control bands to PBG passbands and superchannels.

FIG. 17 generally illustrates a diagram 1700 for mapping of control bands to PBG passbands and superchannels.

As will be understood from FIG. 17, a frequency band 1701 may include a plurality of wavelengths. A WSS may route and/or power-control a plurality of wavelengths within the frequency band 1701. As depicted in FIG. 17, a control passband 1711 may include a first plurality of wavelengths that are jointly routed and/or power-controlled by a WSS and a control passband 1712 may include a second plurality of wavelengths that are jointly routed and/or power-controlled by the WSS. The WSS may be analogous to, for example, the WSS controller module 1810 described in greater detail below with respect to FIG. 18.

As noted above, a PBG (analogous to the PBG 720 depicted in FIG. 7) may include a plurality of PBG passband groups, wherein each PBG passband group is mapped such that it corresponds to a particular control band of the WSS. Accordingly, the PBG passband 1721 may be mapped such that it corresponds to the control passband 1711 and the PBG passband 1722 may be mapped such that it corresponds to the control passband 1712.

Each of the PBG passbands 1721, 1722 may include one or more partitions. For example, the PBG passband 1721 may include a PBG passband partition 1721a and a PBG passband partition 1721b and the PBG passband 1722 may include a PBG passband partition 1722a and a PBG passband partition 1722b. When the mapping of the PBG is performed, the PBG may be partitioned in response to a determination that a control passband includes optical carriers and/or optical slices that are associated with different superchannels.

For example, as depicted in FIG. 17, an optical carrier 1731, an optical carrier 1732, an optical carrier 1741, and an optical carrier 1742 may be associated with "Superchannel 1". The optical carriers 1731-1732 may be included in the control passband 1711, but one or more additional optical carriers (i.e., an optical carrier 1733, and optical carrier 1734, and optical carrier 1735, and an optical carrier 1736) may also be included in the control passband 1711. The optical carriers 1733-1736 may be associated with a superchannel different from "Superchannel 1" or may be associated with no superchannel at all. Accordingly, the optical carriers 1731-1732 may correspond to the PBG passband partition 1721a and the remaining optical carriers 1733-1736 may correspond to the PBG passband partition 1721b.

Although two partitions 1721a-b are shown, it will be understood that a PBG passband may include any number of partitions.

Similarly, the optical carriers 1741-1742 may be included in the control passband 1712 along with one or more additional optical carriers (i.e., an optical carrier 1743, and optical carrier 1744, and optical carrier 1745, and an optical carrier 1746). The optical carriers 1743-1746 may be associated with a superchannel different from "Superchannel 1" or may be associated with no superchannel at all. Accordingly, the optical carriers 1741-1742 may correspond to the PBG passband partition 1722a and the remaining optical carriers 1743-1746 may correspond to the PBG passband partition 1722b.

As will be further understood from FIG. 17, each optical carrier may in turn include one or more optical slices. For example, as depicted in FIG. 17, each optical carrier may include three slices. In particular, the optical carrier 1731 may include an optical slice 1731a, an optical slice 1731b, and an optical slice 1731c. Moreover, the optical carrier 1732 may include an optical slice 1732a, an optical slice 1732b, and an optical slice 1732c. Moreover, the optical carrier 1733 may include an optical slice 1733a, an optical slice 1733b, and an optical slice 1733c, and the optical carrier 1734 may include an optical slice 1734a, an optical slice 1734b, and an optical slice 1734c. Although each optical carrier is depicted as having three optical slices, it will be understood that the any optical carrier may include any number of one or more optical slices.

In the implementation depicted in FIG. 17, the control passband 1711 and the control passband 1712 both have a width equal to eighteen optical slices (i.e., six optical carriers, each optical carrier having three optical slices). By contrast, "Superchannel 1" includes two non-contiguous groupings of six optical slices each. Each non-contiguous grouping of optical slices belonging to a particular superchannel may be referred to as a superchannel passband. Accordingly, it will be understood that in the configuration of FIG. 17, it will be impossible to precisely control the optical slices associated with "Superchannel 1" (for example, optical slices 1731a-c and 1732a-c) without affecting control of optical slices that are not associated with "Superchannel 1" (for example, optical slices 1733a-1734c).

If the WSS is capable of smaller-width control passbands (which may or may not be the case), then finer control resolution may be achieved by selecting control passbands with a smaller width. For example, if the width of the control passbands 1711-1712 was reduced to six optical slices, then it would be possible to control the optical slices associated with "Superchannel 1" without affecting control of other optical slices. Moreover, it may not be necessary to partition the PBG passbands 1721-1722 into partitions 1721a-b and 1722a-b. Likewise, if the width of the control passbands 1711-1712 was reduced to three optical slices, then it would be possible to control each optical carrier individually. And if the width of the control passbands 1711-1712 was reduced even further to one optical slice, then it would be possible to control each optical slice individually.

However, a WSS with a finer control resolution may be more costly that a WSS with a coarser control resolution. Accordingly, a PBG consistent with the present disclosure enables mapping of superchannels to control passbands of the WSS, and vice-versa. Using the PBG, control information can be translated and used more effectively.

Figure 18:
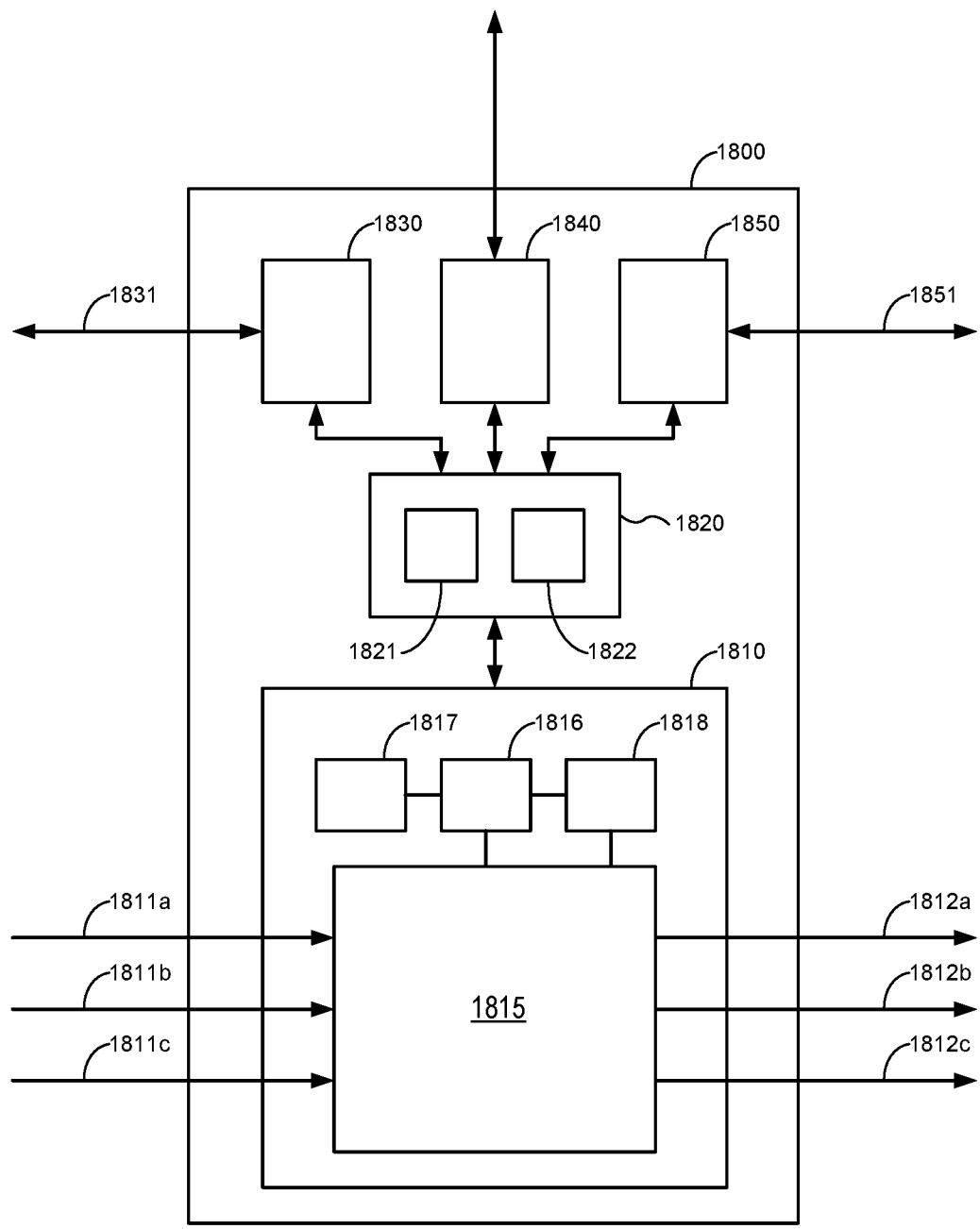
FIG. 18 generally illustrates a node.

FIG. 18 generally illustrates a node 1800. The node 1800 may be analogous to one or more of the nodes 110, 140, and/or 170 depicted in FIG. 1 and may be disposed within an optical link analogous to the optical link 100 depicted in FIG. 1.

The node 1800 may include a WSS controller module 1810, a controller 1820, and a plurality of interfaces including an upstream interface 1830, a user interface 1840, and a downstream interface 1850. The WSS controller module 1810 may include a plurality of optical ports. As depicted in FIG. 18, the plurality of optical ports includes three input ports, an optical port 1811*a*, an optical port 1811*b*, and an optical port 1811*c*. The plurality of optical ports further includes three output ports, an optical port 1812*a*, an optical port 1812*b*, and an optical port 1812*c*. Although the node 1800 is depicted as having three input ports, it will be understood that the node 1800 may have any number of inputs ports or no input ports at all. Although the node 1800 is depicted as having three output ports, it will be understood that the node 1800 may have any number of output ports or no output ports at all. The node 1800 may also include one or more light sinks and/or one or more light sources analogous to the light sinks and light sources depicted in FIG. 1. The WSS controller module 1810 may route and/or power-control the optical signals exchanged with the one or more light sinks and/or one or more light sources.

The WSS controller module 1810 may further include a WSS 1815 coupled to the plurality of optical ports, a WSS processor 1816 and a WSS memory 1817, and an optical power monitor 1818. The WSS processor 1816 and WSS memory 1817 may perform the functions associated with WSS control domains as described above in relation to FIG. 3. For example, the WSS processor 1816 and WSS memory 1817 may operate a multiplexer control loop in a multiplexer control domain analogous to the multiplexer control domains 320, 360 depicted in FIG. 3. Additionally or alternatively, the WSS processor 1816 and WSS memory 1817 may operate a demultiplexer control loop in a demultiplexer control domain analogous to the demultiplexer control domains 350, 380 depicted in FIG. 3. The optical power monitor 1818 may perform optical power monitoring associated with one or more of the plurality of optical ports. The optical power measurements may be provided to the WSS processor 1816 and WSS memory 1817 for power control operations within the WSS control domain.

In some implementations, the WSS controller module 1810 may receive first and second superchannels on one or more of the plurality of input ports 1811*a-c*. The first superchannel may have a first plurality of optical carriers, each of the first plurality of optical carriers having a corresponding one of a first plurality of wavelengths. Similarly, the second superchannel may have a second plurality of optical carriers, each of the second plurality of optical carriers having a corresponding one of a second plurality of wavelengths. The WSS controller module 1810 may further include a plurality of control passbands. The control passbands may be analogous to any of the control passbands in the present disclosure, for example, the control passbands depicted in FIGS. 6-7. Each of the first plurality of wavelengths and each of the second plurality of wavelengths may be within at least one of the plurality of control passbands, collectively. The first and second pluralities of optical carriers may constitute a group of optical carriers. Moreover, collectively, the first and second pluralities of wavelengths constituting a group of wavelengths.

The controller 1820 may include, for example, a processor 1821 and a memory 1822. The controller 1820 may be configured to control the WSS controller module 1810. The controller 1820 may be further configured to determine a PGB analogous to the PBG 720 depicted in FIG. 7. The PBG may be stored, for example, in the memory 1822. The PBG may be determined by mapping the optical carriers and/or optical slices associated with the first superchannel and second superchannel received with one or more of the plurality of input ports 1811*a-c* to one or more control bands associated with the WSS controller module 1810. Accordingly, the PBG may be associated with a plurality of PBG passbands, each of the plurality of PBG passbands corresponding to a plurality of sets of optical slices. Moreover, a wavelength of the group of wavelengths being within an optical slice of one of the plurality of sets of optical slices and a characteristic of an optical carrier within the group of optical carriers and having the wavelength being controlled and monitored based, at least in part, on the optical slice.

The controller 1820 may be further configured to translate control information based on the PBG. For example, the node 1800 may exchange control information with, for example, another node in the optical network. In particular, the node 1800 may exchange control information with an upstream node via the upstream interface 1830 and/or a downstream node via the downstream interface 1850. The control information may be exchanged with the upstream node on an optical control port 1831 and the control information may be exchanged with the downstream node on an optical control port 1851. Although the optical control port 1831 and the optical control port 1851 are depicted as distinct from the optical ports 1811*a-c* and 1812*a-c*, it will be understood that in some implementations, the upstream interface 1830 and the downstream interface 1850 may be components of the WSS controller module 1810, and the optical ports 1811*a-c* and 1812*a-c* may be used to exchange control information.

Similarly, the node 1800 may exchange control information via the user interface 1840. The user interface may be, for example, a northbound/southbound interface. The control information exchanged via the user interface 1840 may be, for example, notifications provided to a user in a "northbound" direction and/or instruction provided by the user in a "southbound" direction. The user may be, for example, a technician that is servicing and/or maintaining the node 1800 or some component thereof.

The control information that is exchanged via one or more of the upstream interface 1830, the user interface 1840, and the downstream interface 1850 may be translated by the controller 1820 in order to facilitate control of the WSS controller module 1810.

In some implementations, the processor 1821 may be further configured to receive first control information associated with the first superchannel and receive second control information associated with the second superchannel. As noted above, the first superchannel and the second superchannel may be received on one or more of the input ports 1811*a-c*. The first control information and the second control information may be received via the upstream interface 1830 from, for example, an upstream node. As noted above, the processor 1821 may determine a PBG and may store the PBG in the memory 1822. The processor 1821 may use the PBG to determine, based on the plurality of PBG passbands, that one or more optical carriers associated with the first superchannel and one or more optical carriers associated with the second superchannel are both included in a particular PBG passband. Because the particular PBG passband corresponds to a particular control passband of the WSS controller module 1810 (as depicted in FIG. 17), this would indicate that the WSS controller module 1810 has a control passband that includes one or more optical carriers associated with the first superchannel and one or more optical carriers associated with the second superchannel. Accordingly, the processor 1821 may combine the first control information and the second control information to generate control information. The combining may be responsive to the determination, based on the PBG, that that one or more optical carriers associated with the first superchannel and one or more optical carriers associated with the second superchannel are both included in the particular PBG passband. The combining may be performed after receiving of the control information via one or more of the upstream interface 1830, the user interface 1840, and the downstream interface 1850.

As a first example of combining control information, consider control information relating to spectrum width. The spectrum width of a superchannel's passband is the total number of slices all its optical carriers are composed of. In this first example, the first control information may include first spectrum width control information indicating a first spectrum width associated with the first superchannel's passband. Similarly, the second control information may include second spectrum width control information indicating a second spectrum width associated with the second superchannel's passband. After determining, based on the PBG, that that one or more optical carriers associated with the first superchannel's passband and one or more optical carriers associated with the second superchannel's passband are both included in a particular PBG passband, the processor 1821 may combine the first control information and the second control information. The combined control information may indicate a combined spectrum width associated with the particular PBG passband. In particular, the combined spectrum width may be determined by adding the first spectrum width (provided in the first control information) and the second spectrum width (provided in the second control information). Accordingly, the spectrum width of the first superchannel's passband and the spectrum width of the second superchannel's passband may be used to determine the spectrum width of a PBG passband that includes both the first superchannel's passband and the second superchannel's passband.

As a second example of combining control information, consider control information relating to power stability. In this second example, the first control information may include first power stability control information indicating whether the first superchannel's passband is stable or unstable. Similarly, the second control information may include second power stability control information indicating whether the second superchannel's passband is stable or unstable. After determining, based on the PBG, that that one or more optical carriers associated with the first superchannel's passband and one or more optical carriers associated with the second superchannel's passband are both included in a particular PBG passband, the processor 1821 may combine the first control information and the second control information. The combined control information may indicate a stability status associated with the particular PBG passband. In particular, the processor 1821 may determine that the particular PBG passband is stable if both the first superchannel's passband and the second superchannel's passband are stable. The processor 1821 may further determine that the particular PBG passband is unstable if either or both of the first superchannel's passband and the second superchannel's passband are unstable. Accordingly, the stability status of the first superchannel and the stability status of the second superchannel may be used to determine the stability status of a PBG passband that includes both the first superchannel's passband and the second superchannel's passband.

As a third example of combining control information, consider control information relating to input power. In this third example, the first control information may include first input power control information indicating an input power associated with the first superchannel's passband. Similarly, the second control information may include second input power control information indicating an input power associated with the first superchannel's passband. After determining, based on the PBG, that that one or more optical carriers associated with the first superchannel's passband and one or more optical carriers associated with the second superchannel's passband are both included in a particular PBG passband, the processor 1821 may combine the first control information and the second control information. The combined control information may indicate an input power associated with the particular PBG passband. In particular, the processor 1821 may determine the combined input power associated with the particular PBG passband by determining the sum of the input power associated with the first superchannel's passband and the input power associated with the second superchannel's passband. Accordingly, the input power of the first superchannel and the input power of the second superchannel may be used to determine the input power of a PBG passband that includes both the first superchannel's passband and the second superchannel's passband.

As a fourth example of combining control information, consider control information relating to noise power. In this fourth example, the first control information may include first noise power control information indicating a noise power associated with the first superchannel's passband. Similarly, the second control information may include second noise power control information indicating a noise power associated with the first superchannel's passband. After determining, based on the PBG, that that one or more optical carriers associated with the first superchannel's passband and one or more optical carriers associated with the second superchannel's passband are both included in a particular PBG passband, the processor 1821 may combine the first control information and the second control information. The combined control information may indicate a noise power associated with the particular PBG passband. In particular, the processor 1821 may determine the combined noise power associated with the particular PBG passband by determining the sum of the noise power associated with the first superchannel's passband and the noise power associated with the second superchannel's passband. Accordingly, the noise power of the first superchannel and the noise power of the second superchannel may be used to determine the noise power of a PBG passband that includes both the first superchannel's passband and the second superchannel's passband.

In some implementations, the processor 1821 may be further configured to generate control information associated with a particular PBG passband of the plurality of PBG passbands in the PBG. The processor 1821 may then determine that the particular PBG passband includes one or more optical carriers associated with a first superchannel's passband and one or more optical carriers associated with a second superchannel's passband. In response to this determination, the processor 1821 may separate the control information into first control information associated with the first superchannel's passband and second control information associated with the second superchannel's passband.

The separating may be performed prior to transmitting of the control information via one or more of the upstream interface 1830, the user interface 1840, and the downstream interface 1850.

As a first example of separating control information, consider control information relating to power stability. In this first example, the WSS controller module 1810 may indicate a stability status of a particular control passband (in particular, whether the control passband is stable or unstable). The processor 1821 may identify, based on the PBG, the PBG passband that corresponds to the particular control passband and the processor 1821 may generate control information that indicates a stability status of the corresponding PBG passband. The processor 1821 may further determine, based on the PBG, that the corresponding PBG passband is associated with a first superchannel's passband and a second superchannel's passband. Accordingly, the processor 1821 may separate the control information into first control information associated with the first superchannel's passband and second control information associated with the second superchannel's passband. If the PBG passband is stable, then the first control information may indicate that the first superchannel's passband is stable and the second control information may indicate that the second superchannel's passband is stable. However, if the PBG passband is unstable, then the first control information may indicate that the first superchannel's passband is unstable and the second control information may indicate that the second superchannel's passband is unstable. After the control information is separated into first control information and second control information, the first control information may be associated with the first superchannel's passband and transmitted via one or more of the upstream interface 1830, the user interface 1840, and the downstream interface 1850. Similarly, the second control information may be associated with the second superchannel's passband and transmitted via one or more of the upstream interface 1830, the user interface 1840, and the downstream interface 1850.

As a second example of separating control information, consider control information relating to effective power-normalized slice count. In this second example, the WSS controller module 1810 may indicate a total power of a particular control passband. The processor 1821 may identify, based on the PBG, the PBG passband that corresponds to the particular control passband and the processor 1821 may generate control information that indicates a total power associated with the corresponding PBG passband. The processor 1821 may further determine, based on the PBG, that the corresponding PBG passband is associated with a first superchannel's passband and a second superchannel's passband. Accordingly, the processor 1821 may separate the control information into first control information associated with the first superchannel's passband and second control information associated with the second superchannel's passband. The processor 1821 may determine, based on the PBG, a partition associated with the first superchannel's passband that is within the corresponding PBG passband. The processor 1821 may then divide the partition's power associated with the first superchannel's passband by the total power associated with the corresponding PBG passband to generate first effective power-normalized slice count control information. Similarly, the processor 1821 may determine, based on the PBG, a partition associated with the second superchannel's passband that is within the corresponding PBG passband. The processor 1821 may then divide the partition's power by the total power associated with the corresponding PBG passband to generate second effective power-normalized slice count control information. The first effective power-normalized slice count control information may be associated with the first superchannel's passband and transmitted via one or more of the upstream interface 1830, the user interface 1840, and the downstream interface 1850. Similarly, the second effective power-normalized slice count control information may be associated with the second superchannel's passband and transmitted via one or more of the upstream interface 1830, the user interface 1840, and the downstream interface 1850.

In some implementations, the processor 1821 may be further configured to exchange control information via the user interface 1840. The control information may include, for example, notifications directed at a user (for example, a technician) in a "northbound" direction and/or instructions received from the user in a "southbound" direction. The user may use the control information to service and/or maintain the node 1800.

As a first example, consider an instruction received via the user interface 1840. The instruction may be associated with a first superchannel. For example, a technician may instruct the node 1800 to transmit the first superchannel's passband at a specified optical power. Upon receiving the instruction, the processor 1821 may identify a PBG passband that includes one or more optical carriers associated with the first superchannel's passband. The processor 1821 may further determine that the PBG passband further includes one or more optical carriers associated with a second superchannel's passband different from the first superchannel's passband. In response to this determination, the processor 1821 may transmit a notification via the user interface 1840. The notification may alert the user that one or more optical carriers associated with the first superchannel's passband cannot be power-controlled without also effecting power-control of one or more optical carriers associated with the second superchannel's passband. The user may then determine a different approach (for example, specify a different transmission power), abandon the instruction, or proceed with the instruction having been notified of the implications thereof.

As a first example, consider a notification transmitted via the user interface 1840. The WSS controller module 1810 may be configured to monitor optical power associated with a particular control passband. The WSS controller module 1810 may be further configured to generate a low power alarm associated with the particular control passband. The processor 1821 may be configured to receive the low power alarm and identify, based on the PBG, a PBG passband that corresponds to the particular control passband. The processor 1821 may further determine, based on the PBG, that the corresponding PBG passband includes one or more optical carriers associated with a first superchannel's passband and one or more optical carriers associated with a second superchannel's passband. In response to this determination, the processor 1821 may transmit a notification via the user interface 1840. The notification may include a first alarm associated with the first superchannel's passband and a second alarm associated with the second superchannel's passband. Based on the notification, the user may then determine that the first superchannel's passband, the second superchannel's passband, or any combination thereof are experiencing low power.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electrical hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A node in an optical network, comprising:
a wavelength selective switch having a plurality of input ports and a plurality of output ports, one or more of the plurality of input ports receiving first and second superchannels,
the first superchannel having a first plurality of optical carriers, each of the first plurality of optical carriers having a corresponding one of a first plurality of wavelengths and the second superchannel having a second plurality of optical carriers, each of the second plurality of optical carriers having a corresponding one of a second plurality of wavelengths,
the wavelength selective switch having a plurality of control passbands,
each of the first plurality of wavelengths and each of the second plurality of wavelengths being within at least one of the plurality of control passbands, collectively,
the first and second pluralities of optical carriers constituting a group of optical carriers, and, collectively, the first and second pluralities of wavelengths constituting a group of wavelengths; and
a processor that determines a passband group (PBG), which is associated with a plurality of PBG passbands, each of the plurality of PBG passbands corresponding to a plurality of sets of optical slices,
a wavelength of the group of wavelengths being within an optical slice of one of the plurality of sets of optical slices,
a characteristic of an optical carrier within the group of optical carriers being controlled and monitored based, at least in part, on the optical slice, the characteristic of the optical carrier including the wavelength of the group of the wavelengths.

2. The node of claim 1, wherein the processor is further configured to:
receive first control information associated with the first superchannel;
receive second control information associated with the second superchannel;
determine, based on the plurality of PBG passbands, that a first superchannel's passband including one or more optical carriers associated with the first superchannel and a second superchannel's passband including one or more optical carriers associated with the second superchannel are both included in a particular PBG passband; and
combine the first control information and the second control information to generate control information, in response to the determination that that the first superchannel's passband and the second superchannel's passband are both included in the particular PBG passband.

3. The node of claim 2, wherein:
the first control information includes first spectrum width control information indicating a first spectrum width associated with the first superchannel's passband;
the second control information includes second spectrum width control information indicating a second spectrum width associated with the second superchannel's passband; and
the control information indicates a combined spectrum width of the particular PBG passband, the combined spectrum width being determined by determining the sum of the first spectrum width and the second spectrum width.

4. The node of claim 2, wherein:
the first control information includes first power stability control information indicating whether the first superchannel's passband is stable or unstable;
the second control information includes second power stability control information indicating whether the second superchannel's passband is stable or unstable; and
the control information indicates that the particular PBG passband is stable if both the first superchannel's passband and the second superchannel's passband are stable and indicates that the particular PBG passband is unstable if either or both of the first superchannel's passband and the second superchannel's passband are unstable.

5. The node of claim 2, wherein:
the first control information includes first input power control information indicating an input power of the first superchannel's passband;
the second control information includes second input power control information indicating an input power of the second superchannel's passband; and
the control information indicates a combined input power of the particular PBG passband, the combined input power being determined by determining the sum of the input power of the first superchannel's passband and the input power of the second superchannel's passband.

6. The node of claim 2, wherein:
the first control information includes first noise power control information indicating a noise power of the first superchannel's passband;
the second control information includes second noise power control information indicating an noise power of the second superchannel's passband; and
the control information indicates a combined noise power of the particular PBG passband, the combined noise power being determined by determining the sum of the noise power of the first superchannel's passband and the noise power of the second superchannel's passband.

7. The node of claim 2, wherein the processor is further configured to receive the first control information and the second control information via one or more of the plurality of input ports.

8. The node of claim 1, the processor being further configured to:
generate control information associated with a particular PBG passband;
determine that the particular PBG passband includes a first superchannel's passband including one or more optical carriers associated with the first superchannel and a second superchannel's passband including one or more optical carriers associated with the second superchannel;
separate the control information into first control information associated with the first superchannel's passband and second control information associated with the second superchannel's passband.

9. The node of claim 8, wherein:
the control information indicates whether the PBG passband is stable or unstable;
the first control information includes first power stability control information indicating that the first superchannel's passband is stable if the control information indicates that the PBG passband is stable and indicating that the first superchannel's passband is unstable if the control information indicates that the PBG passband is unstable; and
the second control information includes second power stability control information indicating that the second superchannel's passband is stable if the control information indicates that the PBG passband is stable and indicating that the second superchannel's passband is unstable if the control information indicates that the PBG passband is unstable.

10. The node of claim 8, wherein:
the control information indicates an effective power-normalized slice count associated with the PBG passband;
the first control information includes first effective power-normalized slice count control information based on a power of a partition associated with the first superchannel's passband divided by a total power of the PBG passband; and
the second control information includes second effective power-normalized slice count control information based on a power of a partition associated with the second superchannel's passband divided by a total power of the PBG passband.

11. The node of claim 8, the processor being further configured to:
associate the first control information with the first superchannel and the second control information with the second superchannel;
transmit the first control information and the first superchannel on one or more of the plurality of output ports; and
transmit the second control information and the second superchannel on one or more of the plurality of output ports.

12. The node of claim 1, wherein the processor is further configured to receive instructions via a user interface and transmit notifications via the user interface.

13. The node of claim 12, wherein the processor is further configured to:
receive an instruction via the user interface, the instruction being associated with the first superchannel;
identify a PBG passband that includes a first superchannel's passband including one or more optical carriers associated with the first superchannel;
determine that the PBG passband further includes a second superchannel's passband including one or more optical carriers associated with the second superchannel; and
transmit a notification via the user interface in response to the determination that the PBG passband includes one or more optical carriers associated with the first superchannel and one or more optical carriers from the second superchannel.

14. The node of claim 12, further comprising a WSS controller, wherein the WSS controller is further configured to monitor optical power associated with a particular control passband, and the processor is further configured to:
receive a low power alarm from the WSS controller, the low power alarm being associated with a particular control passband;
determine, based on the PBG, that the particular control passband corresponds to a corresponding PBG passband and that the corresponding PBG passband includes a first superchannel's passband including one or more optical carriers associated with the first superchannel and a second superchannel's passband including one or more optical carriers associated with the second superchannel; and transmit a notification via the user interface, the notification including a first alarm associated with the first superchannel and a second alarm associated with the second superchannel.

\* \* \* \* \*